United States Patent [19]

Fujioka

[11] Patent Number: 5,796,943
[45] Date of Patent: *Aug. 18, 1998

[54] COMMUNICATION APPARATUS

[75] Inventor: Shuzo Fujioka, Hyogo, Japan

[73] Assignees: Mitsubishi Electric Semiconductor Software Co., Ltd., Hyogo; Mitsubishi Denki Kabushiki Kaisha, Tokyo, both of Japan

[ * ] Notice: The term of this patent shall not extend beyond the expiration date of Pat. No. 5,719,387.

[21] Appl. No.: 655,888

[22] Filed: May 31, 1996

[30] Foreign Application Priority Data

Jan. 26, 1996 [JP] Japan .................................. 8-011899

[51] Int. Cl.[6] .................................................. G11B 23/28
[52] U.S. Cl. ..................................... 395/188.01; 380/3
[58] Field of Search ........................ 395/188.01; 380/3, 380/4

Primary Examiner—Hoa T. Nguyen
Assistant Examiner—P. Vales
Attorney, Agent, or Firm—Leydig, Voit & Mayer, Ltd.

[57] ABSTRACT

A non-contact type IC card comprising a memory including a manufacturer code area and an error signal output circuit is disclosed. The error signal output circuit outputs an error signal such that an access from a read/write apparatus is allowed when a password coincidence is obtained when a predetermined code is stored in the manufacture code area. On the other hand, when the predetermined code is not stored in the manufacturer code area, the error signal output circuit outputs an error signal such that an access to all the memory area from the read/write apparatus is allowed regardless of a result of the password collation performed by the password collation circuit.

20 Claims, 22 Drawing Sheets

COMMUNICATION APPARATUS

This application is related to Ser. No. 08/502,729, filed Jul. 14, 1995.

BACKGROUND OF THE INVENTION

1. Field of the Invention

The present invention relates to a communication apparatus such as a non-contact type IC (Integrated Circuit) card comprising an LSI circuit (Large Scale Integrated) containing a programmable memory.

2. Description of the Related Art

FIG. 25 illustrates a memory map of an LSI containing a programmable memory for a conventional non-contact type IC card. In this figure, reference numeral 10 denotes a memory unit, reference numeral 11 denotes a rewritable programmable memory unit, and reference numeral 12 denotes a non-rewritable fixed memory unit in which data has been previously stored. As shown in FIG. 25, the programmable memory unit 11 is divided into a plurality of areas. Each area has a password with an input password when particular area is accessed to. An access to each area is prohibited when an input password does not coincide with a password corresponding to each area and access to each area is allowed only when an input password coincides with a password corresponding to each area.

In such an LSI, circuit data in an address for storing a password becomes indefinite after completion of wafer processes, thereby becoming difficult to access each area. To eliminate this defect, the conventional communication apparatus is structured in such a way that a master password is stored in the fixed memory unit 12 when the wafer is produced, and that if the master password coincides with an input password, all areas can be accessed or a password change can be allowed despite the result of the comparison of a password corresponding to each area. A memory test can be performed in the conventional LSI circuit by using a master password.

FIG. 26 is a block diagram representation of a conventional non-contact type IC card communication system. In this figure, reference numeral 100 denotes a read/write apparatus, and reference numeral 200 denotes a non-contact type IC card. The non-contact type IC card 200 includes an antenna 201 for transmitting and receiving radio waves, a modulation/demodulation circuit 202 that modulates a carrier wave with data and that demodulates data from modulated carriers, a programmable memory 203 for storing data, and a control circuit 204 for controlling the operations of the non-contact type IC card 200 and for performing command processing. The modulation/demodulation circuit 202, the programmable memory 203, and the control circuit 204 are integrated in an LSI package 210 to be used in a non-contact type IC card. The programmable memory 203 has a structure similar to the memory unit 10 indicated in FIG. 25.

FIG. 27 is a sequence chart illustrates communication procedures between the read/write apparatus 100 and the non-contact type IC card 200. As illustrated in FIG. 27, communication is initiated by sending a Read ID (RID) command from the read/write apparatus 100 to the non-contact type IC card 200. Next, the read/write apparatus 100 sends a command such as a write command or a read command for the programmable memory 203 to the non-contact type IC card 200. The non-contact type IC card 200 performs an input command and the resultant data of the command is sent back to the read/write apparatus 100. If an error such as a communication error and a password comparison error occurs before the command execution step, the command is not executed. In this case, an error status indicating an error is sent to the read/write apparatus 100 or no information is transmitted from the non-contact type IC card 200.

Since the conventional communication apparatus is structured as described above, once the password stored in the fixed memory is known to a third party, a access to the whole memory becomes possible for the third party. Further, a master password cannot be changed.

SUMMARY OF THE INVENTION

The present invention is accomplished in view of the above problems and accordingly, the object of the invention is to provide a communication apparatus with which a memory test is easily performed while maintaining high security.

In order to accomplish the above object, a communication apparatus of the present invention comprises: a memory divided into a first area and a second area, the first area including a third area for storing a predetermined code indicating that an access from an external apparatus to the memory requires a coincidence of a first password; a deciding unit for deciding whether the predetermined code is stored in the third area or not; a password collating unit for collating a first password sent from the external apparatus with a first password stored in the communication apparatus when the external apparatus makes access to the communication apparatus; and access allowing unit for allowing an access from the external apparatus to the second area if a first password sent from the external apparatus coincides with a first password stored in the communication apparatus as a result of a collation of the password collating unit when the predetermined code is stored in the third area and for allowing an access from the external apparatus to the first area or to the second area regardless of a result of a first password collation of the password collating unit when the predetermined password is not stored in the third area.

Namely, in the above described communication apparatus, the access allowing unit allows an access from the external apparatus to the second area of the memory when first password coincidence is obtained when the predetermined code is stored in the predetermined area. On the other hand, when the predetermined code is not stored in the predetermined area of the memory, the password allowing unit allows an access from the external apparatus to the first area or to the second area regardless of a result of a first password collation of the password allowing unit. Therefore, a test to the memory can be eased with high security being maintained.

Further, a communication apparatus of this invention comprising: a memory divided into a first area and a second area, the first area including a third area for storing a predetermined code indicating that an access from an external apparatus to the memory requires a coincidence of a first password; a deciding unit for deciding whether the predetermined code is stored in the third area or not; a password collating unit for collating a first password sent from the external apparatus with a first password stored in the communication apparatus when the external apparatus makes access to the communication apparatus when the predetermined code is stored in the third area; and an access allowing unit for allowing an access from the external apparatus to the second area if a first password sent from the external apparatus coincides with a first password stored in the communication apparatus as a result of a collation of the password collating unit when the predetermined code is stored in the third area and for allowing an access from the external apparatus to the first area or to the second area without performing a first password collation of the password collating unit when the predetermined password is not stored in the third area.

Namely, in the above communication apparatus, the access allowing unit allows an access from the external apparatus to the second area of the memory when a first password coincidence is obtained when the predetermined code is stored in the predetermined area. On the other hand, when the predetermined code is not stored in the predetermined area of the memory, the password allowing unit allows an access from the external apparatus to the first area or to the second area without performing a first password collation of the password collating unit. Therefore, a test to the memory can be eased with high security being maintained.

Further, in a communication apparatus of this invention, the deciding unit decides whether the predetermined code is stored in the third area or not during a period from a time when the communication apparatus receives a command from the external apparatus, which requests the communication apparatus to send an identification code to a time when the communication apparatus sends an identification code to the external apparatus.

With this configuration, high security is obtained by securing the decision on whether the predetermined code is stored or not.

Further, a communication apparatus of this invention is configured such that the first area includes a fourth area in which a second password is stored, that when a second password is sent from the external apparatus when the predetermined code is stored in the third area, the password collating unit collates the second password sent from the external apparatus with the second password stored in the fourth area, and that the access allowing unit allows an access from the external apparatus to the first area or to the second area without requiring a coincidence of a first password in a collation performed by the password collating unit.

Namely, the access allowing unit allows an access from the external apparatus to the first area or to the second area of the memory without requiring a coincidence of the first password when a second password coincidence is obtained even if the predetermined code is stored in the predetermined area. Therefore, a test to the memory can be eased further with high security being maintained.

Further, a communication apparatus of this invention is configured such that the first area includes a fourth area in which a second password is stored, that when a second password is sent from the external apparatus when the predetermined code is stored in the third area, the password collating unit collates the second password sent from the external apparatus with the second password stored in the fourth area, that the communication apparatus further includes counting unit for counting a number of commands sent from the external apparatus after a coincidence of a second password is obtained in collation performed by the password collating means, and that the access allowing unit allows an access from the external apparatus to the first area or to the second area without requiring a coincidence of a first password in a collation performed by the password collating unit when a coincidence of a second password is obtained in a collation performed by the password collating unit and when a number of commands counted by the counting unit exceeds a predetermined number.

Namely, the access allowing unit allows an access from the external apparatus to the first area or to the second area of the memory without requiring a coincidence of a first password when a second password coincidence is obtained and when a number of commands counted by the counting unit exceeds a predetermined number even if the predetermined code is stored in the predetermined area. Therefore, a test to the memory can be eased further with high security being maintained.

Further, a communication apparatus of this invention is configured such that the first area includes a fourth area in which a second password is stored, that when a second password is sent from the external apparatus when the predetermined code is stored in the third area, the password collating unit collates the second password sent from the external apparatus with the second password stored in the fourth area, that the communication apparatus further includes counting unit for counting a number of commands sent from the external apparatus after a coincidence of a second password is obtained in collation performed by the password collating means, and that the access allowing unit allows an access from the external apparatus to the first area or to the second area without requiring a coincidence of a first password in a collation performed by the password collating unit when a coincidence of a second password is obtained in a collation performed by the password collating unit and when a number of commands counted by the counting unit is greater than or equal to a first predetermined number and is less than or equal to a second predetermined number.

Namely, the access allowing unit allows an access from the external apparatus to the first area or to the second area of the memory without requiring a coincidence of a first password when a second password coincidence is obtained and when a number of commands counted by the counting unit is greater than or equal to a first predetermined number and is less than or equal to the second predetermined number even if the predetermined code is stored in the predetermined area. Therefore, a test to the memory can be eased further with high security being maintained.

Further, a communication apparatus of this invention is configured such that the second password includes a read password to be collated when data stored in the memory are read and a write password to be collated when data are written to the memory, that the fourth area includes a read password area for storing the read password and a write password area for storing the write password, that when a read password is sent from the external apparatus when the predetermined code is stored in the third area, the password collating unit collates the read password stored in the read password area with the read password sent from the external apparatus, that when a write password is sent from the external apparatus when the predetermined code is stored in the third area, the password collating unit collates the write password stored in the write password area with the write password sent from the external apparatus, wherein the access allowing unit allows a read command from the external apparatus for the first area or for the second area without requiring a coincidence of a first password when a read password coincidence is obtained as a result of a collation performed by the password collating unit, and that the access allowing unit allows a write command from the external apparatus for the first area or for the second area without requiring a coincidence of a first password when a write password coincidence is obtained as a result of a collation performed by the password collating unit.

Namely, the access allowing unit allows a read command from the external apparatus for the first area or for the second area without requiring a coincidence of a first password when a read password coincidence is obtained as a result of a collation performed by the password collating unit even if the predetermined code is stored in the predetermined area of the memory. Additionally, the access allowing unit allows a write command from the external apparatus for the first area or for the second area without requiring a coincidence of a first password when a write password coincidence is obtained as a result of a collation performed by the password collating unit even if the predetermined code is stored in the predetermined area of the memory. Therefore, a test to the memory can be eased further with high security being maintained.

Further, a communication apparatus of this invention is configured such that the second password includes a read password to be collated when data stored in the memory are read and a write password to be collated when data are written to the memory, that the fourth area includes a read password area for storing the read password and a write password area for storing the write password, that when a read password is sent from the external apparatus when the predetermined code is stored in the third area, the password collating unit collates the read password stored in the read password area with the read password sent from the external apparatus, that when a write password is sent from the external apparatus when the predetermined code is stored in the third area, the password collating unit collates the write password stored in the write password area with the write password sent from the external apparatus, and that the access allowing unit allows both a read command from the external apparatus for the first area or for the second area and a write command from the external apparatus for the first area or for the second area without requiring a coincidence of a first password when both a read password coincidence and a write password coincidence are obtained as a result of a collation performed by the password collating means.

Namely, the access allowing unit allows both a read command from the external apparatus for the first area or for the second area and a write command from the external apparatus for the first area or for the second area without requiring a coincidence of a first password when both a read password coincidence and a write password coincidence are obtained as a result of collation performed by the password collating unit even if the predetermined code is stored in the predetermined area. Therefore, a test to the memory can be eased with higher security being maintained.

DETAILED DESCRIPTION OF THE PREFERRED EMBODIMENTS

The preferred embodiments of the present invention are explained hereinafter in detail with reference to the drawings.

Embodiment 1

Figure 1:
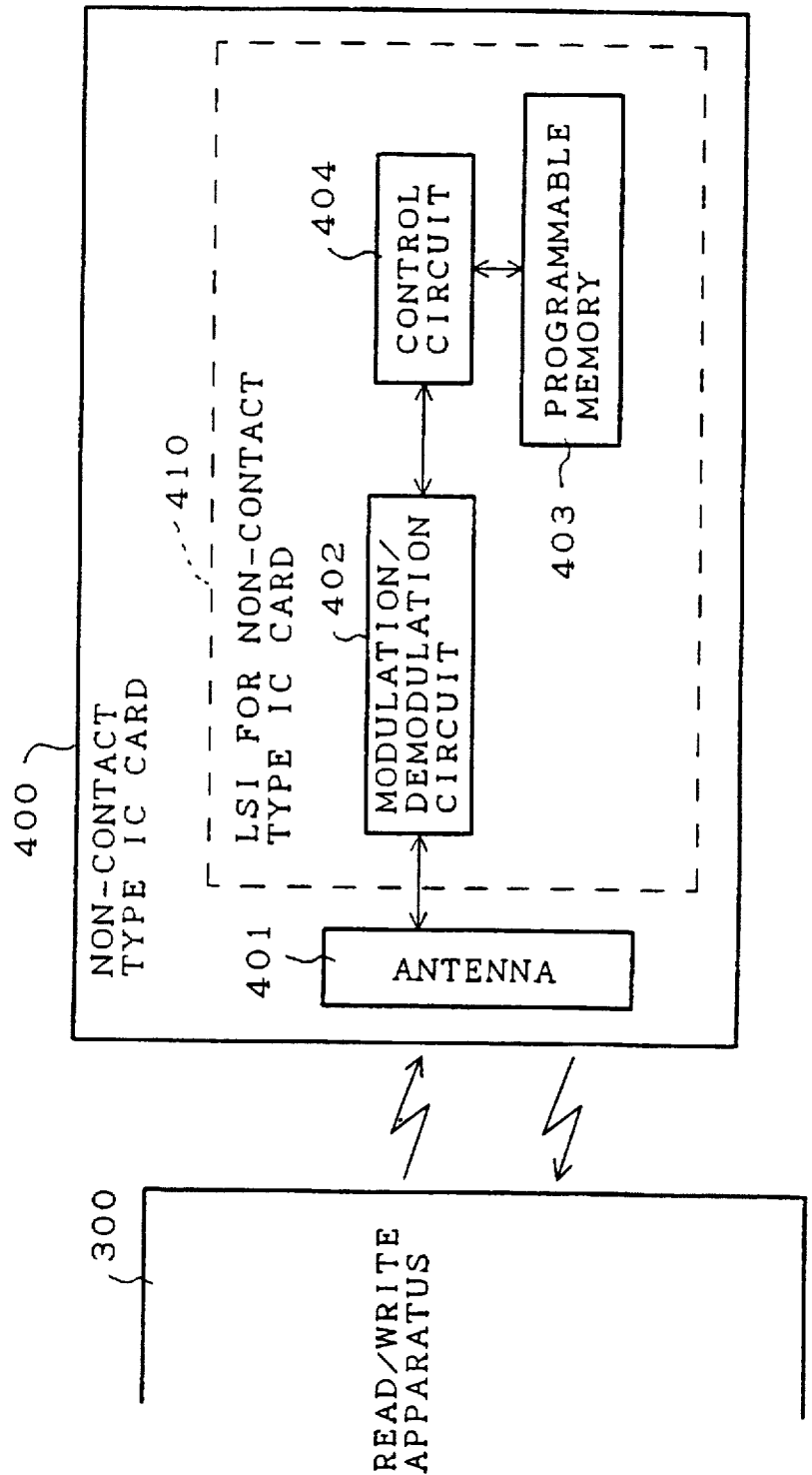
FIG. 1 is a block diagram showing a communication system using a non-contact type IC card of the first embodiment of the present invention.

FIG. 1 is a block diagram showing a communication system using a non-contact type IC card of the first embodiment of the present invention. In this figure, reference numeral 300 denotes a read/write apparatus (external apparatus), and reference numeral 400 denotes a non-contact type IC card (communication apparatus) which communicates with the read/write apparatus 300 via radio waves. The non-contact type IC card 400 includes an antenna 401 for transmitting and receiving radio waves, a modulation/demodulation circuit 402 for modulating a carrier wave with data and for demodulating the data from the modulated waves, programmable memory 403 for storing data and a control circuit 404 for controlling the operations of the non-contact type IC card 400 and for performing command processing. The modulation/demodulation circuit 402, the programmable memory 403 and the control circuit 404 are integrated in the LSI chip 410 for a non-contact type IC card.

Figure 2:
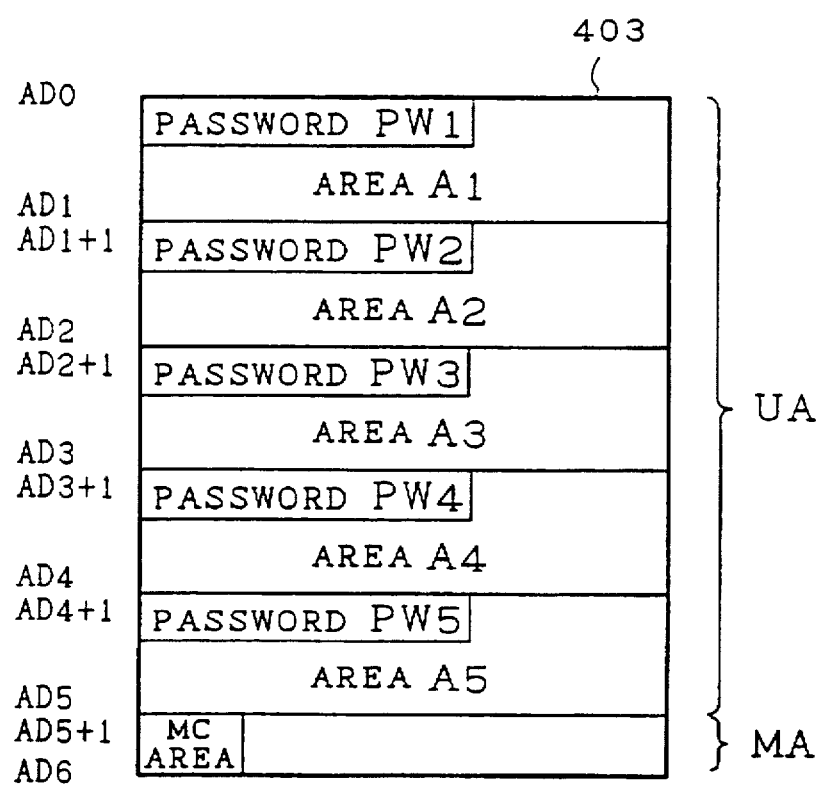
FIG. 2 illustrates a memory map of a programmable memory in a non-contact type IC card in the first embodiment.

FIG. 2 illustrates a memory map of the programmable memory 403 in the non-contact type IC card 400. As indicated in FIG. 2, the area A1 ranges from the address AD0 to the address AD1, the area A2 ranges from the address AD1+1 to the address AD2, the area A3 ranges from the address AD2+1 to the address AD3. The areas A4 and A5 ranges similarly to the areas A1 to A3.

The areas A1 to A5 retain the passwords (first passwords) PW1 to PW5 respectively which are to be collated when an access is made to each area. The areas A1 to A5 constitutes a user area (second area) UA. From the address AD5+1 to the address AD6 located is the manufacturer area (first area) MA which includes the manufacturer's code area (third area) for retaining a manufacturer's code used for making the passwords PW1 to PW5 valid. It is not recommended to use the codes "00H", "01H", "03H", "07H", "0FH", "1FH", "3FH", "7FH", "FFH", "80H", "COH", "E0H", "F0H", "F8H", "FCH", "FEH" as a manufacturer's code because these codes often appear on the memory 403 after wafer processing is completed. Further, it is not recommended either to use the codes "00H", "FFH", "FAAH", "55H" as a manufacturer's code because these codes are written on the memory 403 during a memory test. For example, the codes "12H", "34H" may be used as a manufacturer's code. The following embodiments will be explained assuming the usage of the code "12H" as a manufacturer's code.

At first, access to the memory 403 during a memory test will be explained. The timing of setting a manufacturer's code is different depending on whether a product is shipped in the form of the LSI chip or in the form of a non-contact type IC card. In the following description, the case of shipping a non-contact type IC card as a product will be explained.

Figure 3:
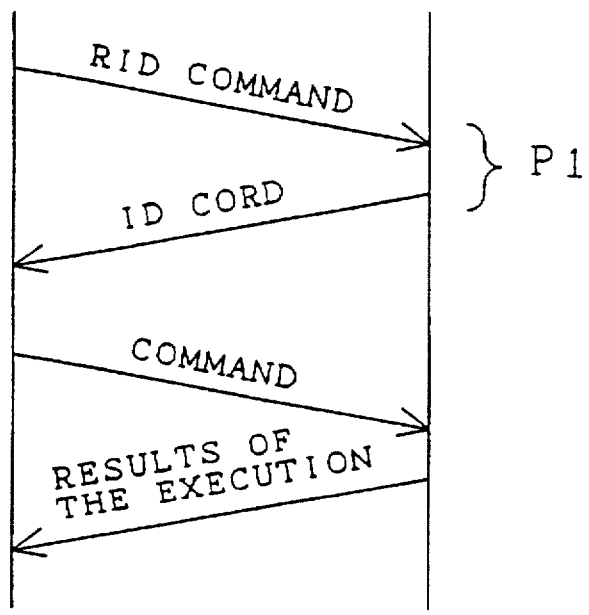
FIG. 3 is a sequence chart showing communication procedures between a read/write apparatus and a non-contact type IC card in the first embodiment.

FIG. 3 is a sequence chart showing communication procedures between the read/write apparatus 300 and the non-contact type IC card 400. As indicated in FIG. 3, the read/write apparatus 300 sends a Read ID (RID) command to the non-contact type IC card 400. Upon receiving an RID command, the non-contact type IC card 400 judges whether or not the predetermined code "12H" is stored in the MC area in the manufacturer's area MA of the programmable memory 403 during the period P1. When the predetermined code "12H" is stored in the MC area, an access from the read/write apparatus 300 requires a coincidence of a password corresponding to the area to be accessed. On the other hand, the predetermined code "12H" is not stored in the MC area, an access from the read/write apparatus 300 is allowed even if a password coincidence is not obtained in a password collation.

After the completion of the judgement on whether or not the predetermined code "12H" is stored in the MC area, the non-contact type IC card 400 sends its own ID string to the read/write apparatus 300. Next, the read/write apparatus 300 receives and analyzes the ID string sent from the non-contact type IC card 400. When the read/write apparatus 300 confirms that the non-contact type IC card 400 is the one to communicate with, the read/write apparatus 300 sends a command requiring a certain process to the non-contact type IC card 400. Namely, all the other commands can be executed only after the RID command is executed properly.

Figure 4:
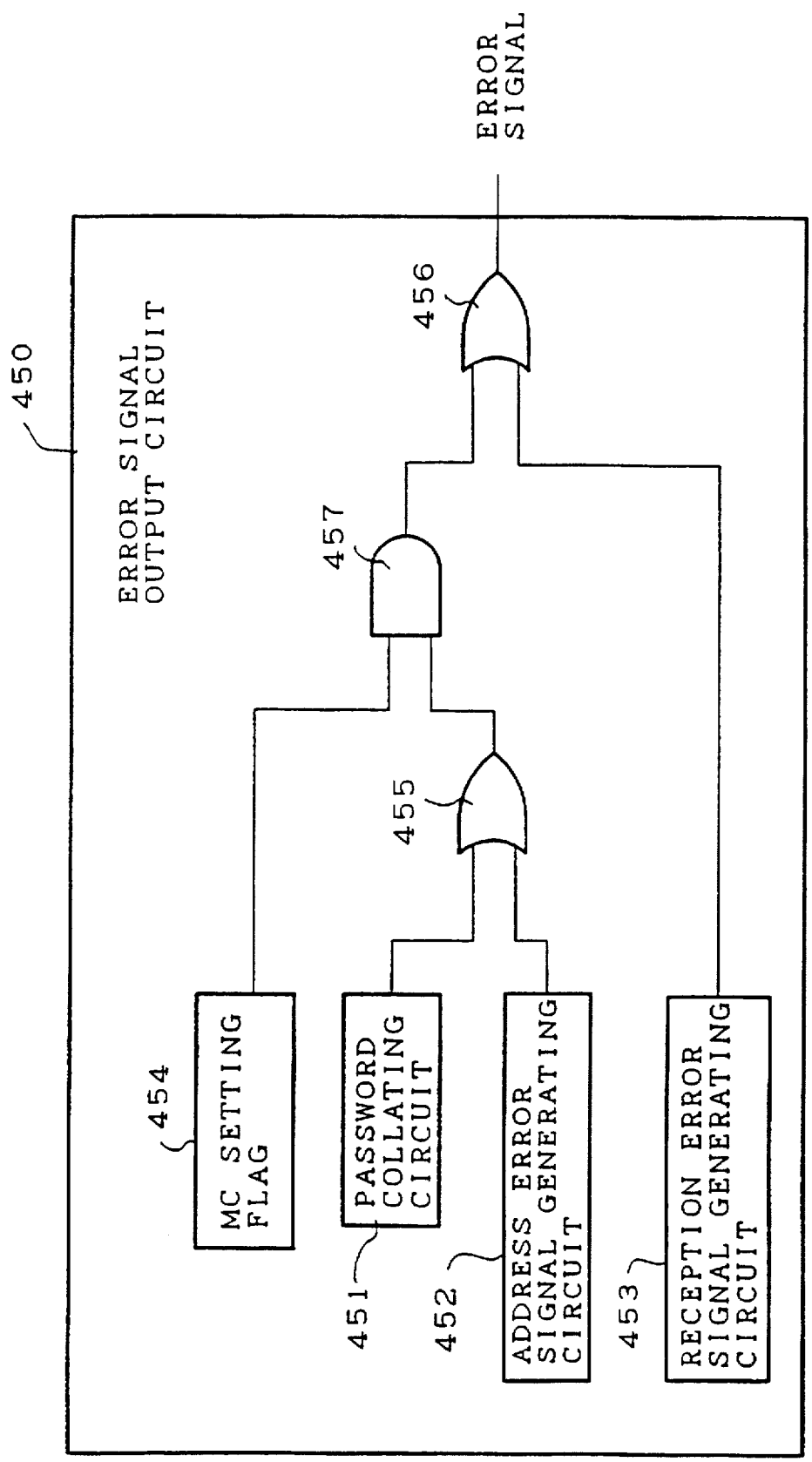
FIG. 4 illustrates a configuration of an error signal output circuit of a control circuit, which performs error processing when a non-contact type IC card receives a command in the first embodiment.

FIG. 4 illustrates the configuration of the error signal output circuit (access allowing means) 450 of the control circuit 404. The error signal outputting circuit 450 performs error processing when the non-contact type IC card 400 receives a command issued from the read/write apparatus 300. In FIG. 4, reference numeral 451 denotes a password collating circuit which collates the stored password with an input password and which outputs a password error signal having an "H" level when a password coincidence is not obtained, reference numeral 452 denotes an address error signal producing circuit which outputs an address error signal having an "H" level when an address outside of the allowed area is designated by the non-contact type IC card 400, reference numeral 453 denotes a reception error signal producing circuit which outputs a reception error signal having an "H" level when a signal reception error occurs, reference numeral 454 denotes an MC setting flag in which an "H" level signal is stored when the predetermined code "12H" is stored in the MC area and an "L" level signal is stored when the predetermined code "12H" is not stored in the MC area, reference numerals 455 and 456 denote an OR-gate, and reference numeral 457 denotes an AND-gate. The decision of setting a value in the MC setting flag 454 is performed by the control circuit 404 and the value is written in the MC setting flag 454. Before the predetermined code "12H" is written in the MC area, a value such as "FFH" is in the MC area. At this time, the MC setting flag 454 outputs an "L" level signal. Therefore, a password error signal output from the password collating circuit 451 and an address error signal output from the address error signal producing circuit 452 are masked at the AND-gate 457 and an error signal having an "H" level is output from the OR-gate 456 only when a reception error occurs. Therefore, error processing is not performed when a reception error does not occur even when a password error or an address error occurs. Thus, the memory area from the address AD0 to the address AD6 can be accessed even if an input password does not coincide with the password stored in the memory 403 during a memory test for the non-contact type IC card 400. Namely, the error signal output circuit 450 operates so as to decide whether an access sent from an external apparatus should be allowed or not.

After a memory test is finished, the predetermined code "12H" is written in the MC area and an "H" level signal is written in the MC setting flag 454. Therefore, an error signal having an "H" level is output from the OR-gate 456 when any one of a password error signal, an address error signal and a reception error signal becomes an "H" level. Therefore, after the predetermined code "12H" is written in the MC area, an access is allowed only when an input password coincides with the password stored in the memory 403 and the access is made to an address within the area ranging from the address AD0 to the address AD5 of the programmable memory 403.

Figure 5:
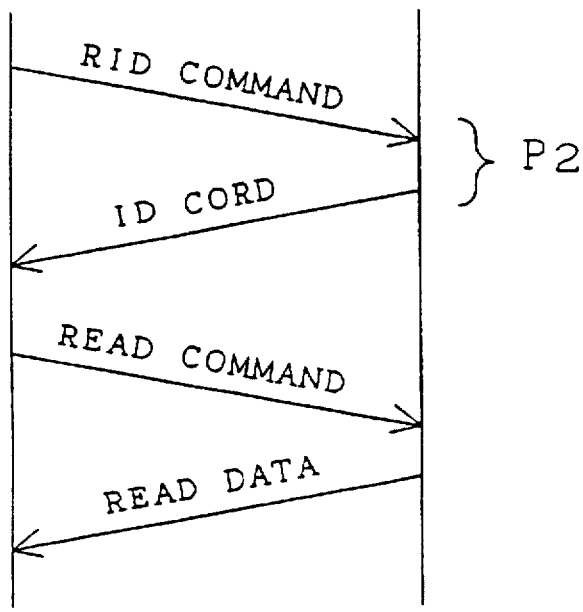
FIG. 5 is a sequence chart showing communication procedures between a read/write apparatus and a non-contact type IC card in a case where the read/write apparatus sends a read command to the non-contact type IC card.
Figure 6:
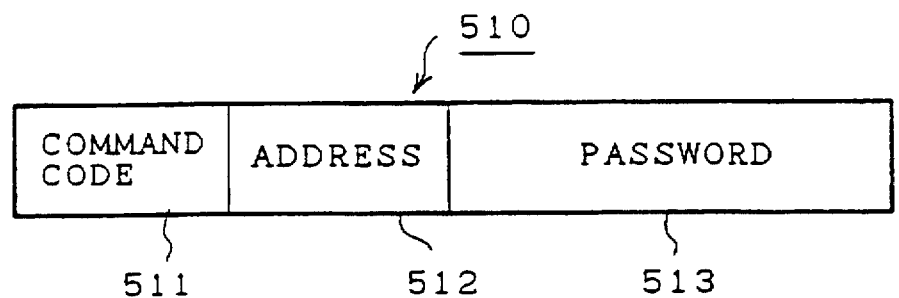
FIG. 6 illustrates a format of a read command.
Figure 7:
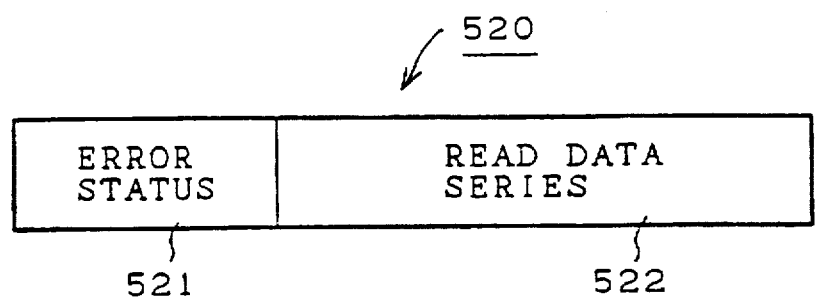
FIG. 7 illustrates a format of read date to be sent from a non-contact type IC card to a read/write apparatus when a read command is sent from the read/write apparatus.

FIG. 5 is a sequence chart showing communication procedures between the read/write apparatus 300 and the non-contact type IC card 400 in a case where the read/write 300 apparatus sends a read command to the non-contact type IC card 400. FIG. 6 illustrates a format of a read command 510. As indicated in FIG. 6, the read command 510 illustrates a command code 511, an address 512 of the data to be read and a password 513. FIG. 7 illustrates a format of a read data 520 to be sent from the non-contact type IC card 400 to the read/write apparatus 300 when a read command 510 is sent from the read/write apparatus 300. As shown in FIG. 7, the read data 520 includes an error status 521 indicative of an error status and a read data series 522.

As indicated in FIG. 5, a data communication between the read/write apparatus 300 and the non-contact type IC card 400 is initiated by sending an RID command from the read/write apparatus 300 to the non-contact type IC card 400. Upon receiving an RID command, the non-contact type IC card 400 judges whether the predetermined code "12H" is stored in the MC area or not and performs operations based on the results of this judgement during the period P2 as explained above with reference to FIG. 3. Thereafter, the non-contact type IC card 400 sends its own ID cord to the read/write apparatus 300. All the other commands can be executed only after the RID command is executed properly. When the read/write apparatus 300 sends a read command 510 to the non-contact type IC card 400, the non-contact type IC card 400 sends the read data 520 including the data series of the programmable memory 403 corresponding to the address 512 of the read command 510 and the error status 521 to the read/write apparatus 300 provided that the password 513 coincides with the password stored in the memory 403 when the predetermined code "12H" is stored in the MC area. On the other hand, when the predetermined code "12H" is not stored in the MC area, an access to the memory 403 is allowed regardless of the result of the collation of the password 513 and the read data 520 is sent from the non-contact type IC card 400.

Figure 8:
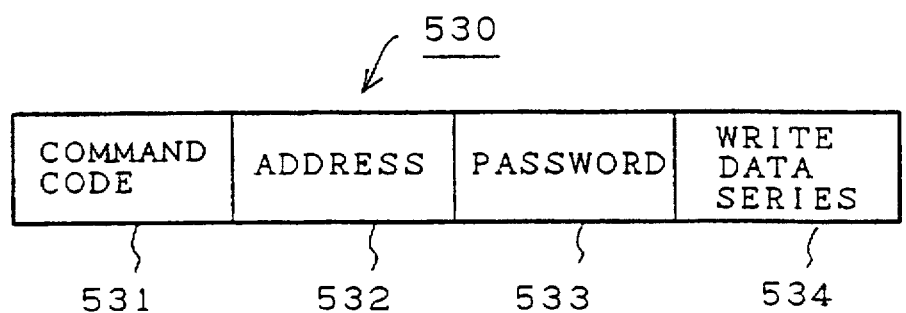
FIG. 8 illustrates a format of a write command.

A case where the read/write apparatus 300 sends a write command to the non-contact type IC card is similar to the case of sending a read command as explained above. FIG. 8 illustrates a format of the write command 530. As indicated in FIG. 8, the write command 530 includes a command string 531, an address 532 at which data is written, a password 533 and write data series 534. When a write command is executed, the non-contact type IC card 400 sends an error status to the read/write apparatus 300. In this case, the coincidence of the password 533 is necessary for executing the write command 530 when the predetermined code "12H" is stored in the MC area while a write command is executed even if the coincidence of the password 533 is not obtained when the predetermined code "12H" is not stored in the MC area.

As explained above, a password error does not occur even if an input password does not coincide with the password stored in the memory 403 when the predetermined code "12H" is not stored in the MC area. Therefore, a memory test before shipping the product becomes easier because all the areas of the memory can be accessed for writing or for reading by sending any password. Further, high security can be obtained because once the predetermined code "12H" is set in the MC area, a password coincidence is required and if the input password does not coincide with the password stored in the memory 403, a read access and a write access to the programmable memory 403 are prohibited.

Embodiment 2

The fundamental configuration of the second embodiment is similar to that of the first embodiment. However, this embodiment differs from the first embodiment in the following points. Namely, although the password collation is performed when the read command 510 or the write command 530 is received even if the predetermined code is not set in the MC area according to the first embodiment, the control circuit 404 is configured such that the password collation is omitted when a read command, a write command or the like is received in this second embodiment.

Figure 9:
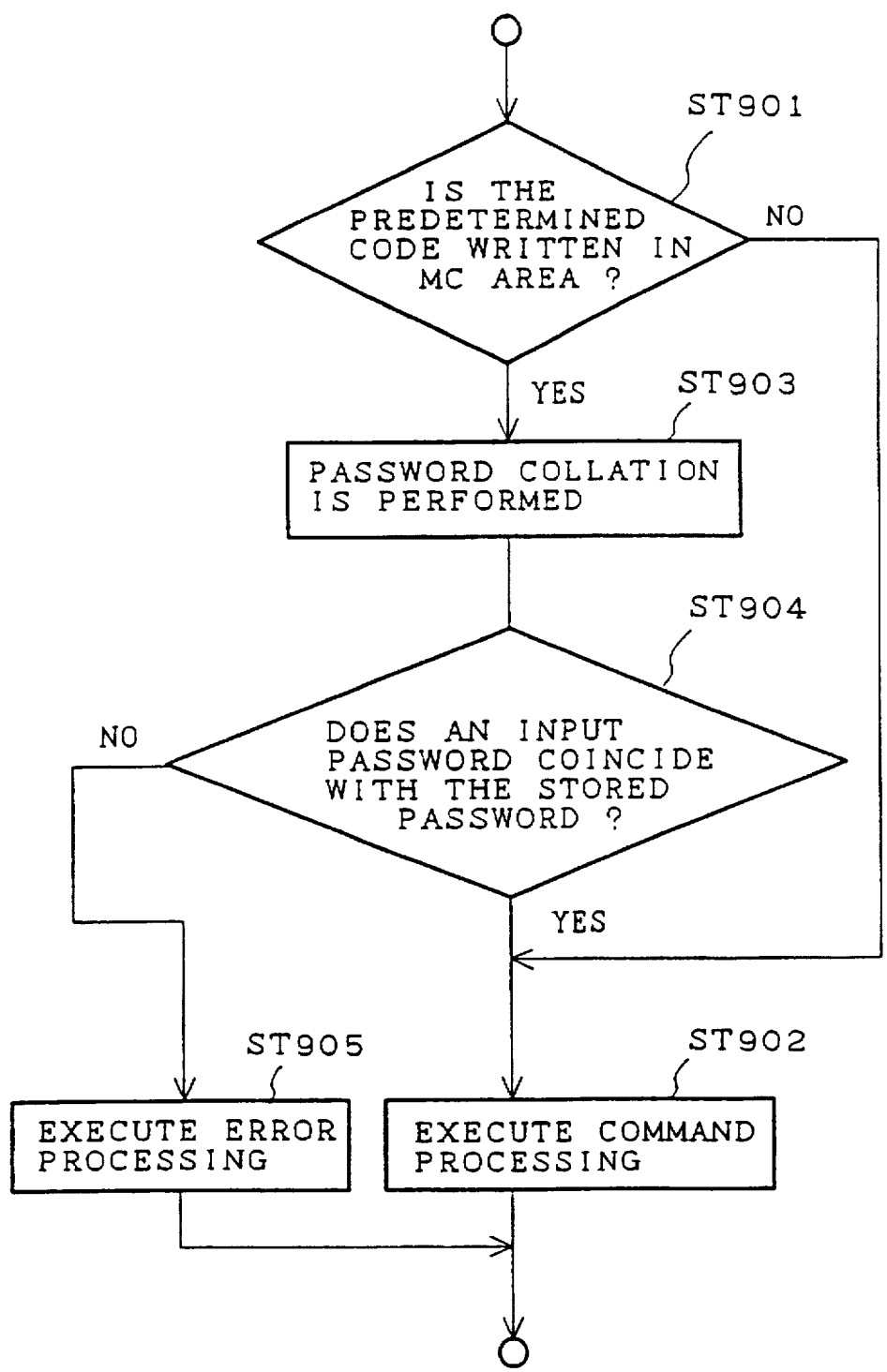
FIG. 9 is a flow chart showing operations concerning a decision on whether a password collation is performed or not depending on a setting status of an MC area in the second embodiment.

FIG. 9 is a flow chart showing the operations concerning the decision on whether the password collation is performed or not depending on the status of the MC area. As shown in the FIG. 9, when the predetermined code "12H" is not stored in the MC area (step ST901), the command processing is performed without collating the passwords (step ST902). On the other hand, the predetermined code "12H" is stored in the MC area, the password collation is performed (step ST903). When an input password is identical to the stored password (step ST904), command processing is executed. When an input password is not identical to the stored password (step ST904), password error processing is performed (step ST905).

Figure 10:
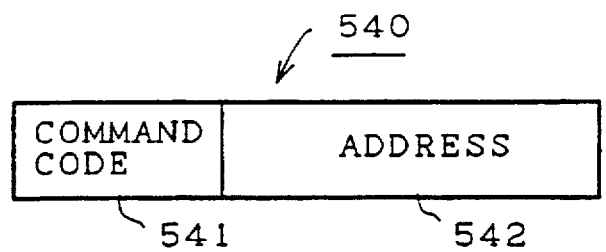
FIG. 10 shows a structure of a read command to be transmitted from a read/write apparatus to a non-contact type IC card when a predetermined code is not set in an MC area in the second embodiment.

FIG. 10 shows a structure of the read command 540 to be transmitted from the read/write apparatus 300 to the non-contact type IC card 400 when the predetermined code "12H" is not set in the MC area. As shown in FIG. 10, the read command 540 includes of the command code 541 and the address 542 at which the data are read, and a password is not contained in the read/write command 540.

As explained above, it is not necessary to send a password when the predetermined code "12H" is not set in the MC area in the second embodiment. Further, the time for collating passwords is not required. Therefore, the time period required for a memory test can be reduced.

Embodiment 3

The fundamental configuration of the third embodiment is similar to that of the first embodiment. The programmable memory 403 and control circuit 404 of this third embodiment differ from those of the first embodiment in the following points.

Figure 11:
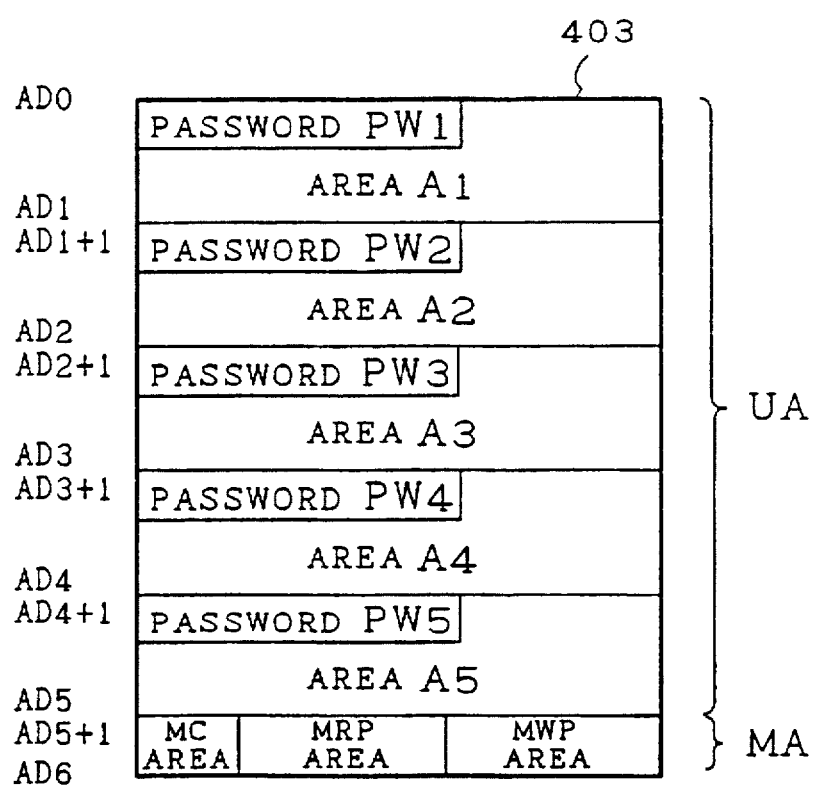
FIG. 11 shows a memory map of a programmable memory of the third embodiment.

FIG. 11 shows a memory map of the programmable memory 403 of this embodiment. As shown in FIG. 11, the manufacturer area MA includes the MC area for storing the Manufacturer Code (MC), the Manufacturer Read Password (MRP) area (the forth area) for storing MRP (second password) and the Manufacturer Write Password (MWP) area (the forth area) for storing MWP (second password). The MRP and MWP will be explained in detail subsequently.

Figure 12:
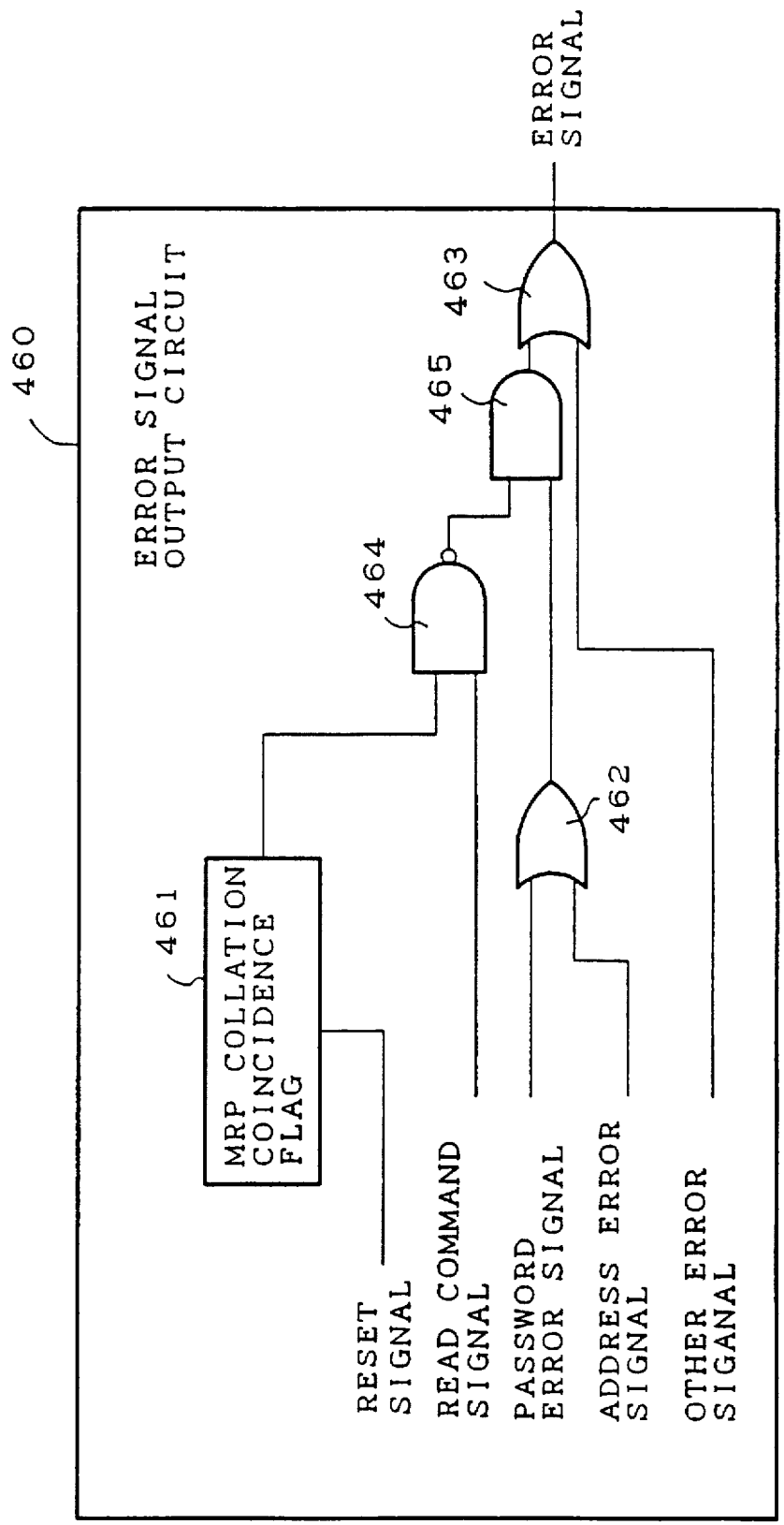
FIG. 12 shows a configuration of an error signal output circuit provided in a control circuit in the third embodiment, for performing error processing when a read command is received.

FIG. 12 shows a configuration of the error signal output circuit (access allowing means) 460 provided in the control circuit 404, for performing error processing when a read command is received. In FIG. 12, the reference numeral 461 denotes an MRP collation coincidence flag in which an "H" level signal is stored when an input MRP coincides with the MRP stored in the manufacturer area MA of the programmable memory 403 and in which an "L" level signal is stored when an input MRP does not coincide with the stored MRP. The reference numerals 462 and 463 denote an OR-gate, reference numeral 464 denotes an NAND-gate, and reference numeral 465 denotes an AND-gate. The output signal from the MRP collation coincidence flag 461 and a read command signal which becomes "H" level when a read command is received are input to the input terminals of the NAND-gate 464. Therefore, when an input MRP is identical to the stored MRP when a read command is received, an error signal is not output from the OR-gate 463 even if a password error or an address error occurs because an error signal indicating a password error or an address error is masked at the AND-gate 463, thereby the password error processing and the address error processing are not performed.

Figure 13:
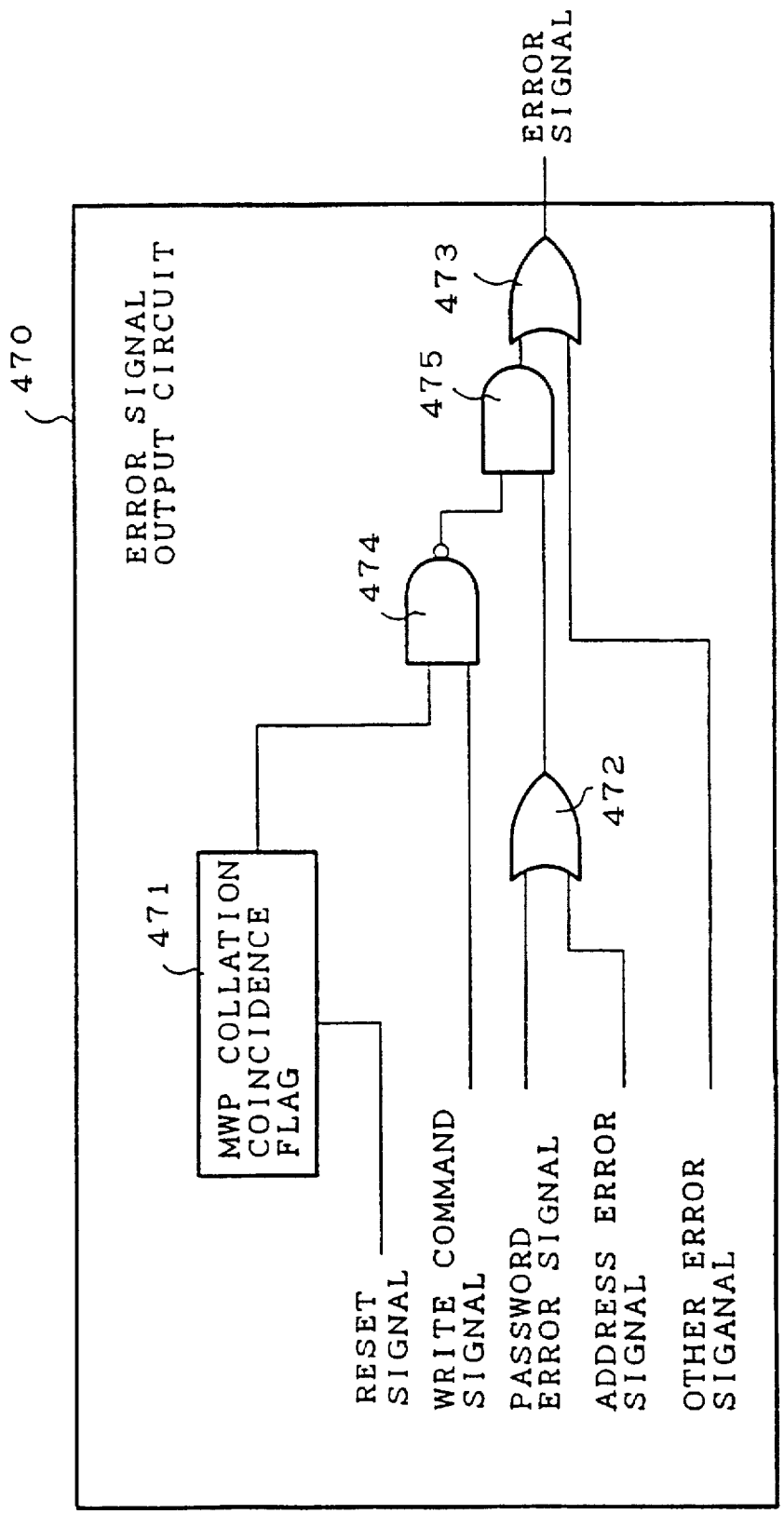
FIG. 13 shows a configuration of an error signal output circuit provided in the control circuit in the third embodiment, for performing error processing when a write command is received.

FIG. 13 shows the configuration of error signal output circuit (access allowing means) 470 provided in the control circuit 404, for performing error processing when a write command is received. In FIG. 13, reference numeral 471 denotes an MWP collation coincidence flag in which an "H" level signal is stored in the manufacturer area MA of the programmable memory 403 and in which an "L" level signal is stored when an input MWP does not coincide with the stored MWP. The output signal from the MWP collation coincidence flag 471 and a write command signal which becomes "H" level when a write command is received are input to the input terminals of the NAND-gate 474. Therefore, when an input MWP is identical to the stored MWP when a write command is received, an error signal is not output from the OR-gate 473 even if a password error or an address error occurs because an error signal indicating a password error or an address error is masked at the AND-gate 475, thereby the password error processing and the address error processing are not performed. The MRP collation coincidence flag 461 and the MWP collation coincidence flag 471 are configured such that these flags are reset to "L" by a reset signal.

Figure 14:
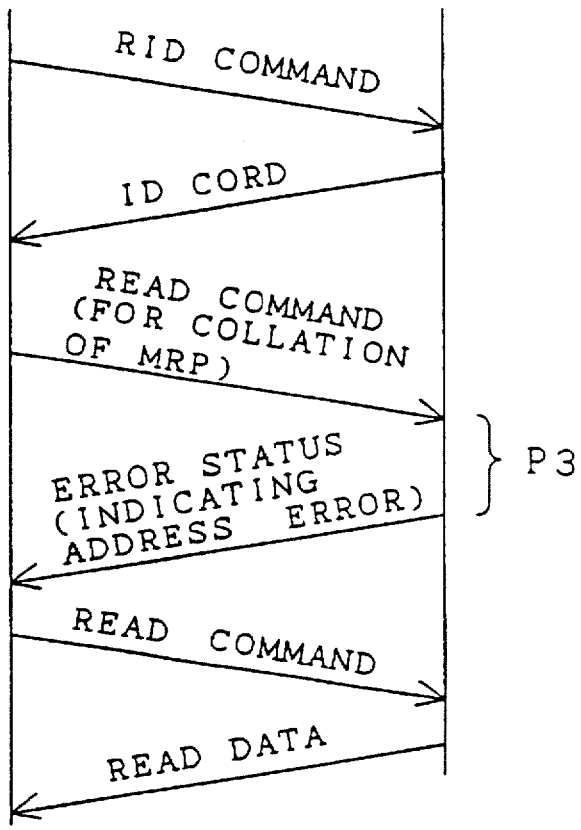
FIG. 14 is a sequence chart showing communication procedures between a read/write apparatus and a non-contact type IC card when read command processing is performed in the third embodiment.

FIG. 14 is a sequence chart showing communication procedures between the read/write apparatus 300 and the non-contact type IC card 400 in a case where a read command processing is performed. The operations from the time when the read/write apparatus 300 sends an RID command to the non-contact type IC card 400 to the time when the read/write apparatus 300 receives an ID string sent from the non-contact type IC card 400 are the same as those explained in the first embodiment. The non-contact type IC card 400 is released from a reset state and the IC card 400 is reset at the end of the communication. Therefore, the MRP collation coincidence flag 461 and the MWP collation coincidence flag 471 contain an "L" level signal before the communication begins.

Figure 15:
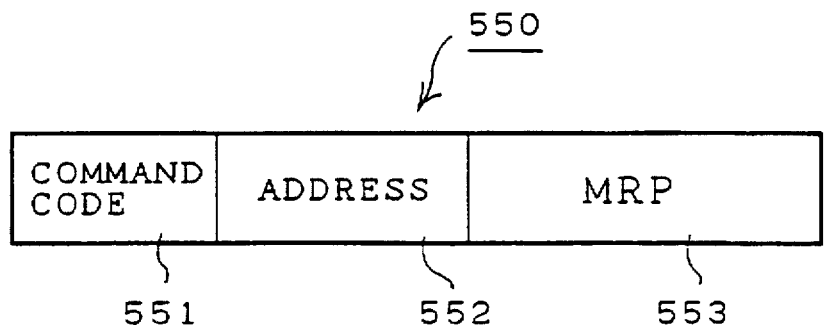
FIG. 15 shows a structure of a read command for an MRP collation.

Next, the read/write apparatus 300 sends a read command for an MRP collation to the non-contact type IC card 400. FIG. 15 shows a structure of the read command. As shown in FIG. 15, the read command includes of a command code 551, address 552 of the MRP of the manufacturer area MA and MRP 553. When the non-contact type IC card 400 receives the read command 550, the MRP is collated. When an input MRP coincides with the stored MRP, the MRP collation coincidence flag 461 is set to "H" during the period P3. On the other hand, when an input MRP does not coincide with the stored MRP, the MRP collation coincidence flag 461 is maintained as an "L" level signal. The read command 550 contains the address 552 which is within the manufacturer area MA in which the access is not allowed. Therefore, the non-contact type IC 400 sends an error status indicative of an address error to the read/write apparatus 300. Namely, at this point of time, the read command is regarded from out side of the non-contact type IC card 400 just as a read command with an address error being occurred.

In the above explanation, the read/write apparatus 300 specifies the address of the manufacturer area MA directly using the read command 550. However, the system may be made such that the read/write apparatus 300 sends a predetermined address which is in the outside of the user area UA to the non-contact type IC card 400. In this case, the non-contact type IC card 400 is structured such that when the non-contact type IC card 400 receives the predetermined address in a read command, the IC card 400 recognizes the read command having the predetermined address as a read access to the address of the MRP of the manufacturer area MA. With this configuration, it is not necessary to transmit a real address of the manufacturer area MA which is near the user area UA, thereby higher security may be obtained.

Next, when the read/write apparatus 300 sends the read command 550 to the non-contact type IC card 400, a password error processing is not performed even if the passwords are not identical when the MRP collation coincidence flag 461 contains an "H" level signal, thereby a read access to all the addresses of the programmable memory 403 is allowed and the data corresponding to the accessed address are transmitted to the read/write apparatus 300. When the MRP collation coincidence flag 461 is maintained as an "L" level signal, a read access is allowed to the area from the address AD0 to the address AD5 in the programmable memory 403 only when an input password coincides with the stored password.

Figure 16:
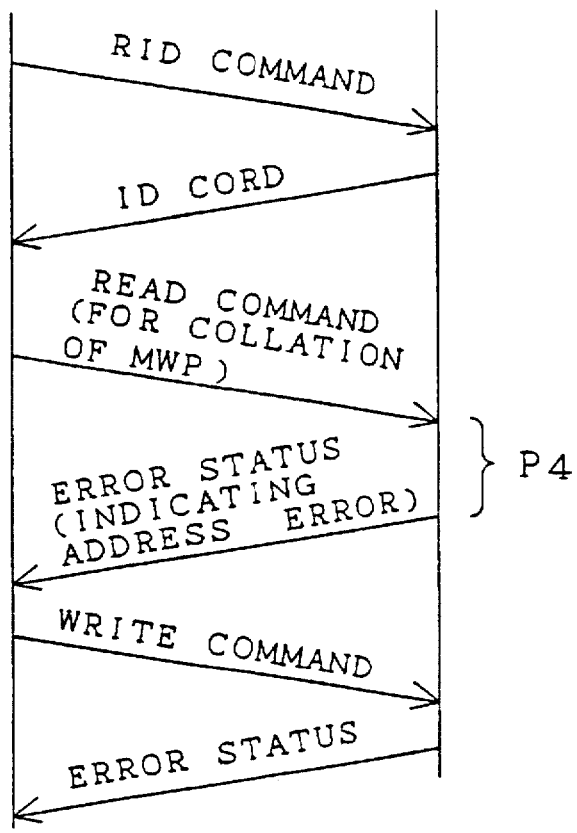
FIG. 16 is a sequence chart showing communication procedures between a read/write apparatus and a non-contact type IC card in a case where the write command processing is being performed in the third embodiment.

FIG. 16 is a sequence chart showing communication procedures between the read/write apparatus 300 and the non-contact type IC card 400 in a case where a write command processing is performed. The operations from the time when the read/write apparatus 300 sends an RID command to the non-contact type IC card 400 to the time when the read/write apparatus 300 receives an ID string sent from the non-contact type IC card 400 are the same as those explained in the first embodiment.

Figure 17:
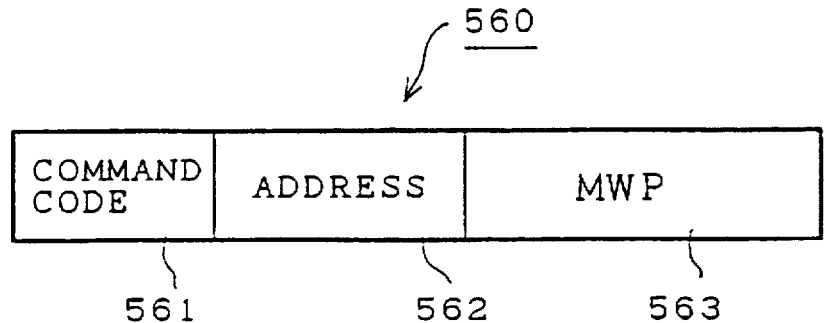
FIG. 17 shows a structure of a read command for an MWP collation.

Next, the read/write apparatus 300 sends a read command for an MWP collation to the non-contact type IC card 400. FIG. 17 shows a structure of the read command. As shown in FIG. 17, the read command 560 includes of a command code 561, address 562 of the MWP of the manufacturer area MA and MWP 563. When the non-contact type IC card 400 receives the read command 560, the MWP is collated. When an input MWP coincides with the stored MWP, the MWP collation coincidence flag 471 is set to "H" during the period P4. On the other hand, when an input MWP does not coincide with the stored MWP, the MWP collation coincidence flag 471 is maintained as an "L" level signal. The read command 560 contains the address 562 which is within the manufacturer area MA in that the access is not allowed. Therefore, the non-contact type IC 400 sends an error status indicative of an address error to the read/write apparatus 300. Namely, at this point, the read command is regarded from the outside of the non-contact type IC card 400 just as a read command with an address error having occurred.

Next, when the read/write apparatus 300 sends the write command 560 to the non-contact type IC card 400, password error processing is not performed even if the passwords are not identical when the MWP collation coincidence flag 471 contains an "H" level signal, thereby a write access to all the addresses of the programmable memory 403 is allowed and the data is written to the corresponding address. Thereafter, the non-contact type IC 400 sends error status data to the read/write apparatus 300 to notify the status of errors and the completion of the writing. When the MWP collation coincidence flag 471 is maintained as an "L" level signal, a write access is allowed to the area from the address AD0 to the address AD5 in the programmable memory 403 only when an input password coincides with the stored password.

As explained above, in this third embodiment, a password error and an address error may be neglected by performing the predetermined procedures even after the predetermined code "12H" is stored in the manufacturer area MA for the purpose of defect analysis for example. Therefore, a test in the defect analysis may be easily implemented with high security being maintained.

Embodiment 4

The fundamental configuration of the forth embodiment is similar to that of the third embodiment. However, this embodiment differs from the third embodiment in the following points.

Figure 18:
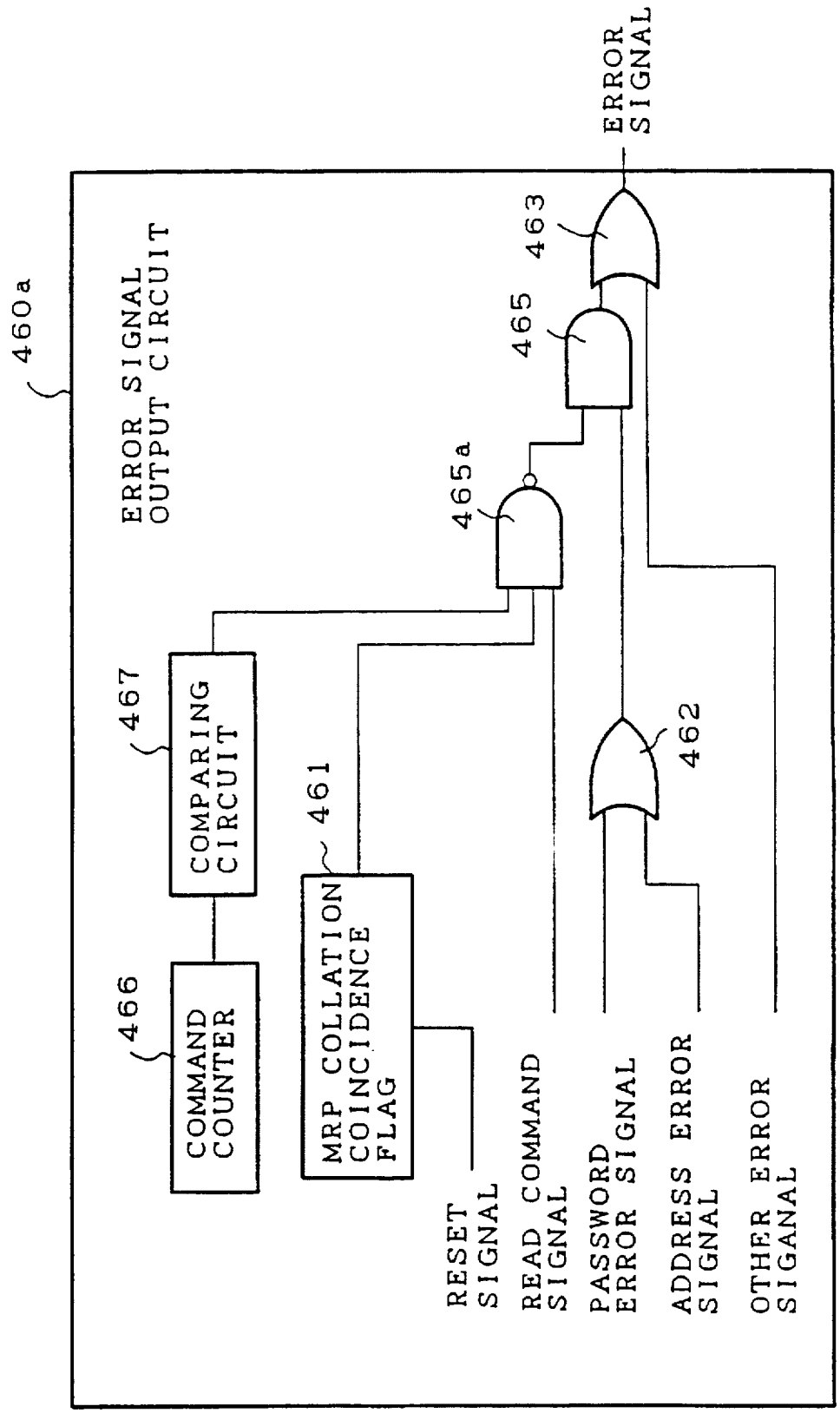
FIG. 18 shows a configuration of an error signal output circuit provided in a control circuit of a non-contact type IC card of the fourth embodiment in a case where a read command is received.

FIG. 18 shows the configuration of the error signal output circuit (access allowing means) 460a in a case where, a read command is received, provided in the control circuit 404 of the non-contact type IC card 400 of this embodiment. In FIG. 18, reference numeral 466 denotes a command counter which counts a number of read commands received after the MRP collation is completed, reference numeral 467 denotes a comparing circuit which compares a number counted by the command counter 460a with a predetermined value, and reference numeral 465a denotes a 3-input NAND-gate. The same reference numbers are attached to the same portions as those shown in FIG. 12 and duplicate explanations are omitted.

Figure 19:
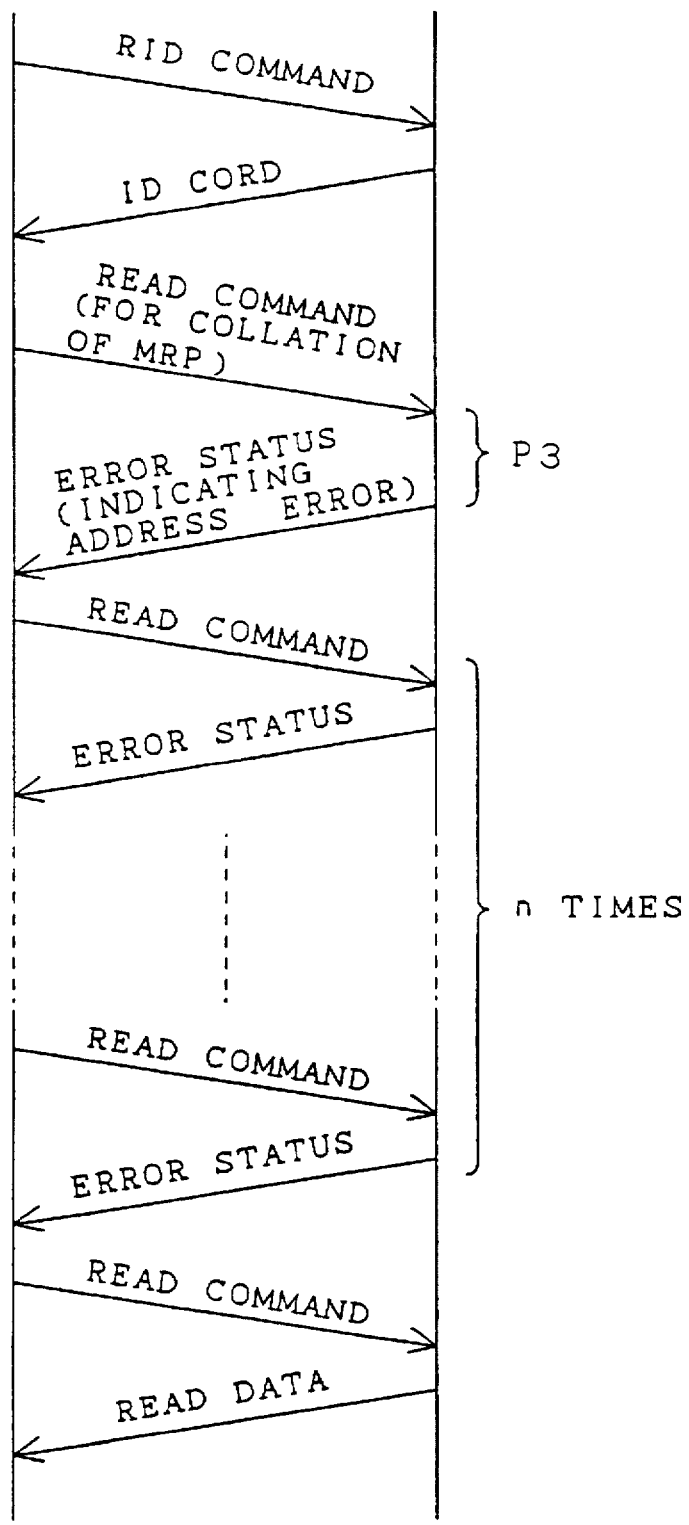
FIG. 19 is a sequence chart showing communication procedures between a read/write apparatus and a non-contact type IC card in the fourth embodiment.

FIG. 19 is a sequence chart showing communication procedures between the read/write apparatus 300 and the non-contact type IC card 400. As shown in FIG. 19, the operations from the time when the read/write apparatus 300 sends an RID command to the non-contact type IC card 400 in order to start the communication to the time when the read/write apparatus 300 receives an error status sent from the non-contact type IC card 400 at the end of the period P3 are the same as those explained in the third embodiment. Thereafter, when the read/write apparatus 300 sends read commands to the non-contact type IC card 400, the command counter 466 counts read commands and outputs a number of the read commands counted by the command counter 466. When the command counter 466 outputs a count value larger than n (n:integer), the comparing circuit 467 outputs an "H" level signal. Namely, a password error and an address error are valid for n read commands after the MRP collation coincidence flag 461 is set. However, a password error and address error are invalid for (n+1)-th read command and the read commands received later than the (n+1)-th read command. Therefore, the security may be made higher to a third person who does not know that a read command is allowed to make access without a password coincidence only after n read commands are received.

Similarly, the non-contact type IC card is configured such that a password error and an address error is valid for n consecutive write commands after the MWP collation coincidence flag is set and the (n+1)-th write command and the write commands sent later than the (n+1)-th write command are executed even if a password error or an address error occurs.

Figure 20:
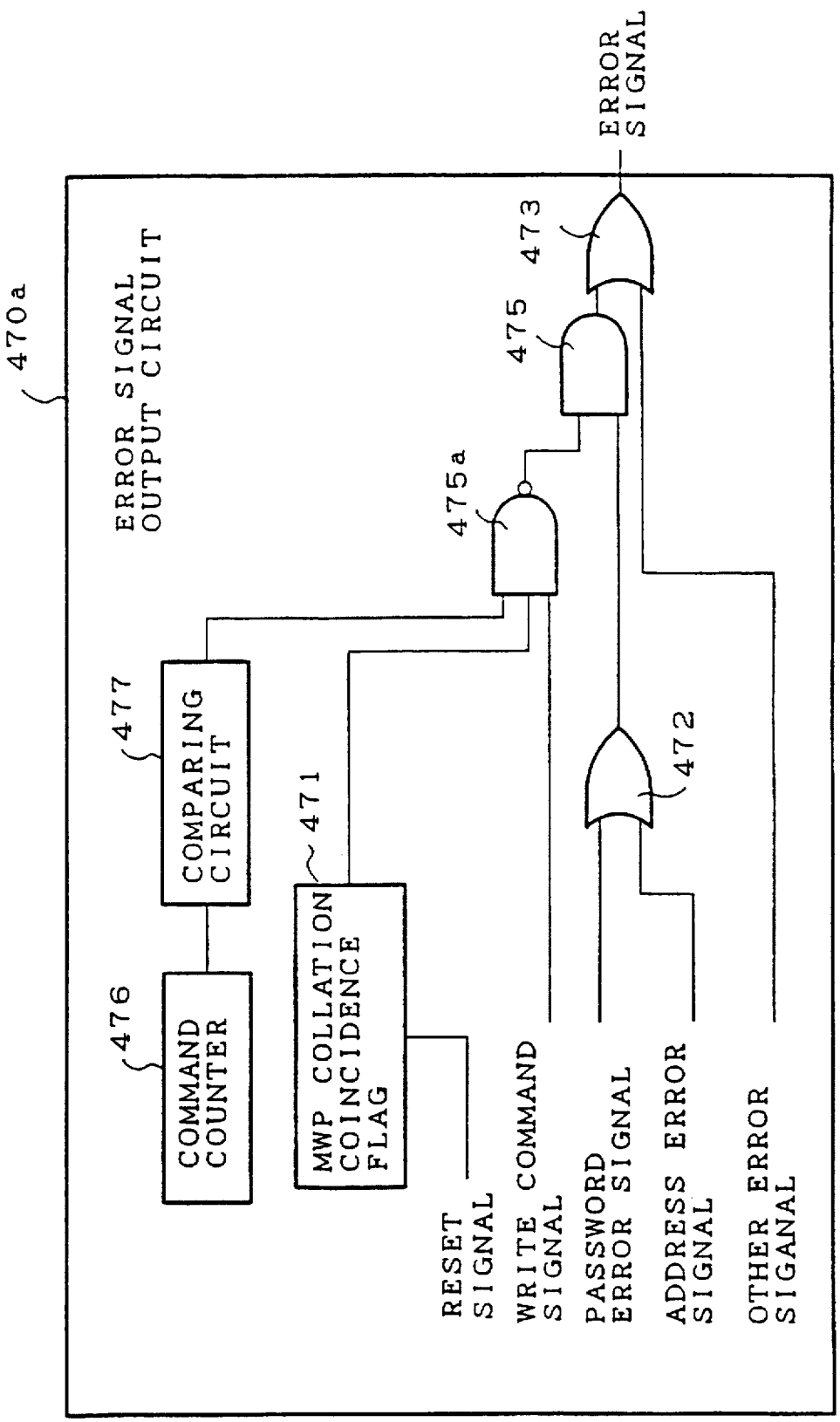
FIG. 20 shows a configuration of an error signal output circuit in the fourth embodiment.

FIG. 20 shows the configuration of the error signal output circuit 470a which realizes the function explained above. In FIG. 20, the reference numeral 476 denotes a command counter which counts a number of write commands after the MWP collation coincidence flag 471 is set, reference numeral 477 denotes a comparing circuit which outputs an "H" level signal when a number of the write commands counted by the command counter 476 exceeds n (n:integer). Therefore, the security may be made higher to a third person who does not know that a write command is allowed to make access without a password coincidence only after n write commands are received.

As explained above, memory tests may be easily implemented with higher security being maintained in this forth embodiment.

Embodiment 5

The fundamental configuration of the fifth embodiment is similar to that of the fourth embodiment. However, this embodiment differs from the fourth embodiment in the following points. In the fourth embodiment, the comparing circuits 467 and 477 are configured such that an "H" level signal is output from the comparing circuits 467 and 477 when the counted number exceeds the predetermined value n. However, in this embodiment, the comparing circuits 467 and 477 may be configured such that the circuits 467 and 477 keep outputting an "H" level signal while the counted number is in a range from i to j (i, j:integer, i<j) and keep outputting an "L" level signal while the counted number is equal to or larger than j+1. With this configuration, accesses of the commands from the i-th read/write command to the j-th read/write command are allowed without a password coincidence. The password coincidence is required for the (j+1)-th read/write command and the read/write commands sent later than the (j+1)-th read/write command.

As explained above, memory tests may be easily implemented with higher security being maintained in this forth embodiment.

Embodiment 6

The fundamental configuration of sixth embodiment is similar to that of the third embodiment. However, this embodiment differs from the third embodiment in the following points. In the third embodiment, the MRP and the MWP are used independently. However, in this embodiment, the IC card 400 is configured such that both the read commands and the write commands may be executed for the whole area of the programmable memory 403 without a password coincidence when both of the input MRP and the input MWP are identical to the stored MRP and the stored MWP respectively.

Figure 21:
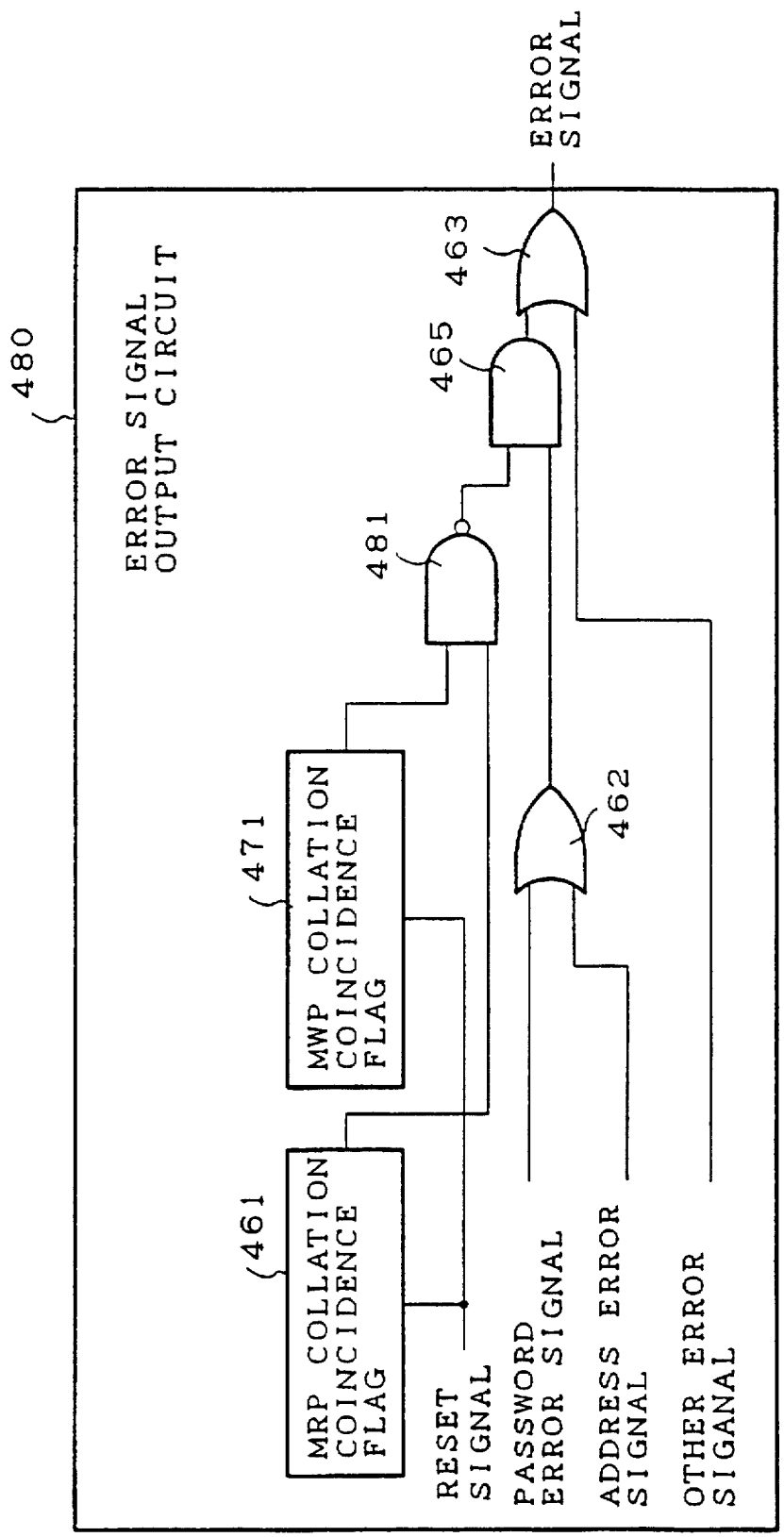
FIG. 21 is a circuit diagram showing a configuration of an error signal output circuit in the sixth embodiment.

FIG. 21 is a circuit diagram showing the configuration of the error signal output circuit 480 of the control circuit 404. In FIG. 21, reference numeral 481 denotes an AND-gate to which the output from the MRP collation coincidence flag 461 and the output from the MWP collation coincidence flag 471 are input. The same reference numerals are attached to the same portions as those indicated in FIGS. 12 and 13 and duplicate explanations are omitted.

Figure 22:
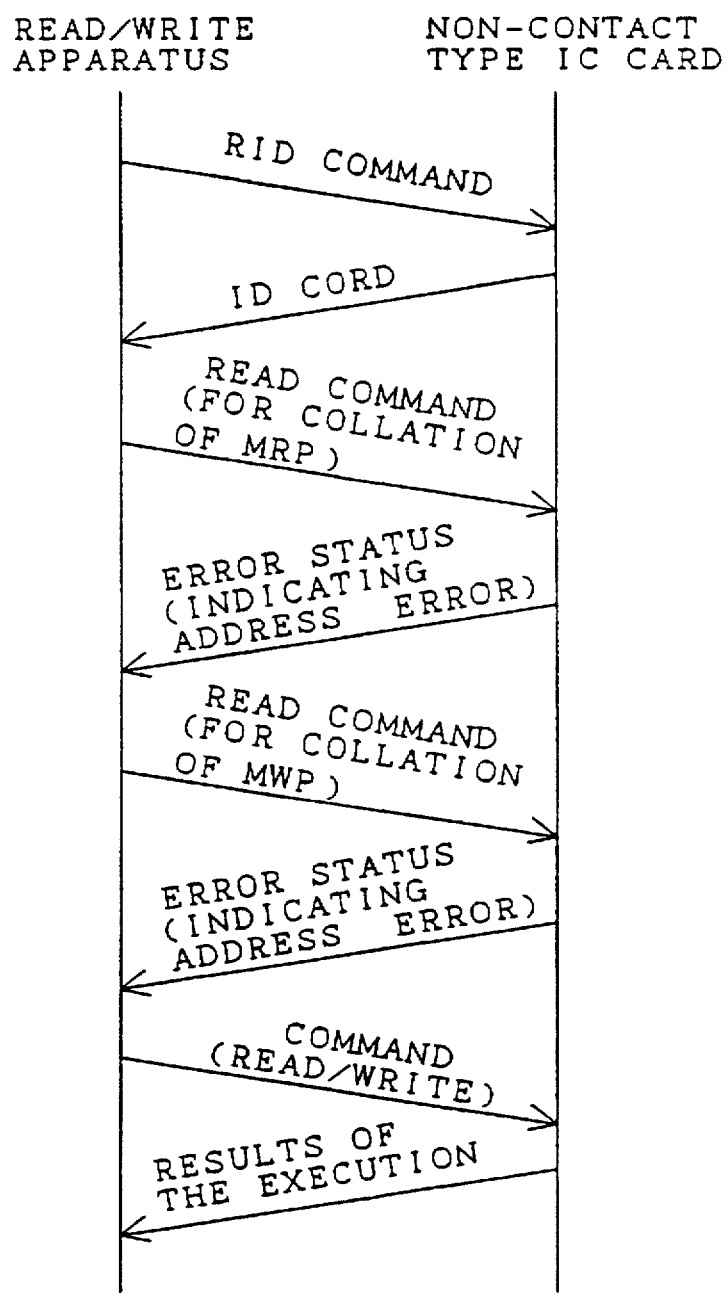
FIG. 22 is a sequence chart showing communication procedures between a read/write apparatus and a non-contact type IC card in the sixth embodiment.

FIG. 22 is a sequence chart showing communication procedures between the read/write apparatus 300 and the non-contact type IC card 400. As shown in FIG. 22, a read command for collating MRP is transmitted from the read/write apparatus 300 to the non-contact type IC card 400 after confirming the ID string and an MRP collation is performed in the IC card 400. Next, a read command for collating MWP is sent from the read/write apparatus 300 to the non-contact type IC card 400 and an MWP collation is performed in the IC card 400. When both of the MRP and MWP which are sent from the read/write apparatus coincide with the stored MRP and the stored MWP respectively in the collations, both the read commands and the write commands are allowed to be executed for all the addresses of the programmable memory 403 regardless of the results of the collations of the passwords PW1 to PW5. Further, password collations may be omitted as explained in the second embodiment.

Embodiment 7

The fundamental configuration of the seventh embodiment is similar to the sixth embodiment. However, this seventh embodiment differs from the sixth embodiment in the following points. Namely, in the sixth embodiment, after both the inputted MRP and the input MWP are identical to those stored in the memory 403, read commands and write commands are executed without the need of coincidence of the passwords PW1 to PW5 in the collation procedures. However, in this seventh embodiment, n commands after the input MRP and inputted MWP coincide with those stored in the memory 403 in the collation procedures require a coincidence of the passwords PW1 to PW5, however, the (n+1)-th command and commands after the (n+1)-th command do not require a password coincidence in the collation procedures.

Figure 23:
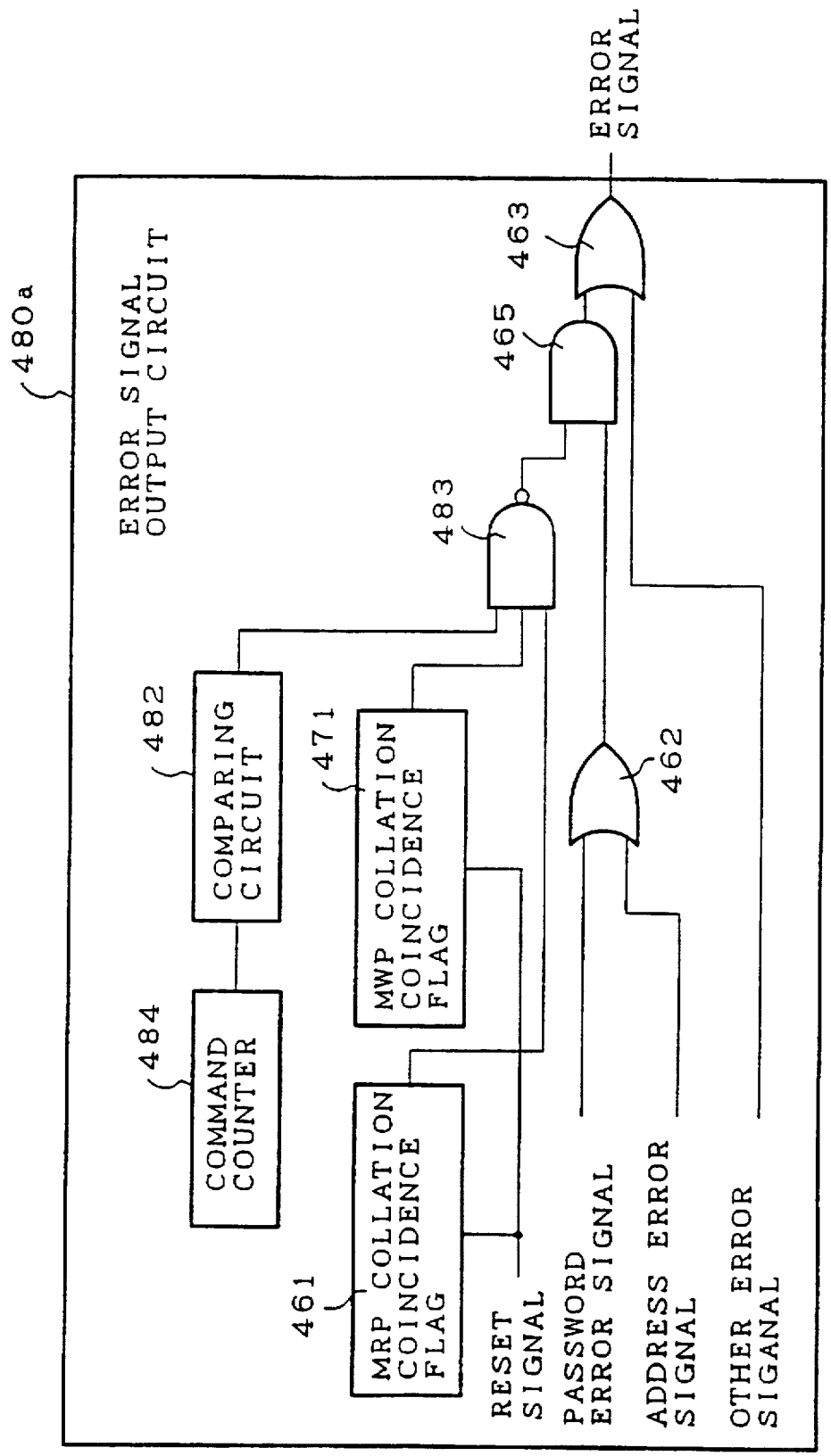
FIG. 23 shows a configuration of an error signal output circuit provided in the control circuit of the non-contact type IC card in the seventh embodiment.

FIG. 23 is a block diagram showing the configuration of the error signal output circuit 480a provided in the control circuit 404 of the non-contact type IC card 400 in this embodiment. The same reference numerals are attached to the same portions in FIG. 21 and duplicate explanations are omitted. In FIG. 23, reference numeral 484 denotes a command counter which counts a number of read commands or write commands which are received by the non-contact type IC card 400 after both the MRP collation coincidence flag 461 and the MWP collation coincidence flag 471 are set to "H", reference numeral 482 denotes a comparing circuit which outputs an "H" level signal when a number counted by the command counter 484 exceeds n, reference numeral 483 denotes 3-input NAND-gate to which the outputs from the MRP collation coincidence flag 461, the MWP collation coincidence flag 471 and the comparing circuit 482 are input.

Figure 24:
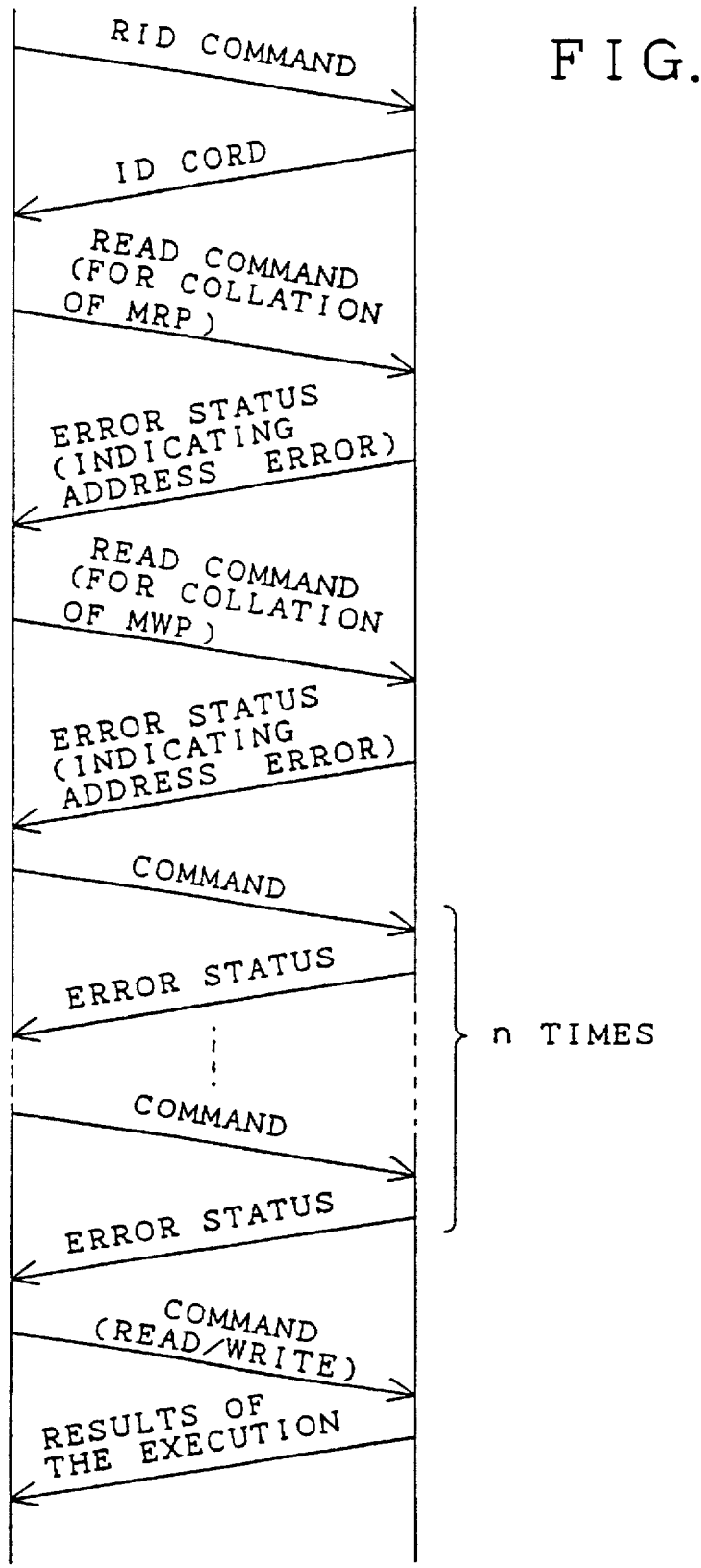
FIG. 24 is a sequence chart showing communication procedures between a non-contact type IC card and a read/write apparatus in the seventh embodiment.
Figure 25:
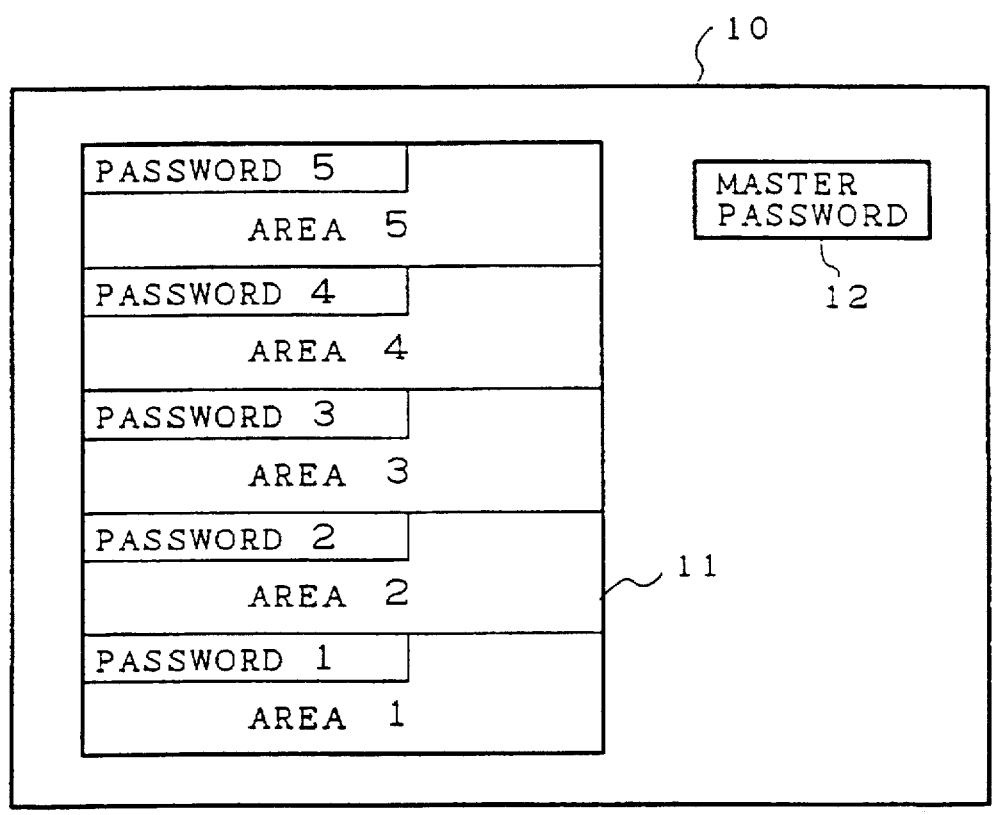
FIG. 25 illustrates a memory map of an LSI containing a programmable memory to be used in a conventional non-contact type IC card.
Figure 26:
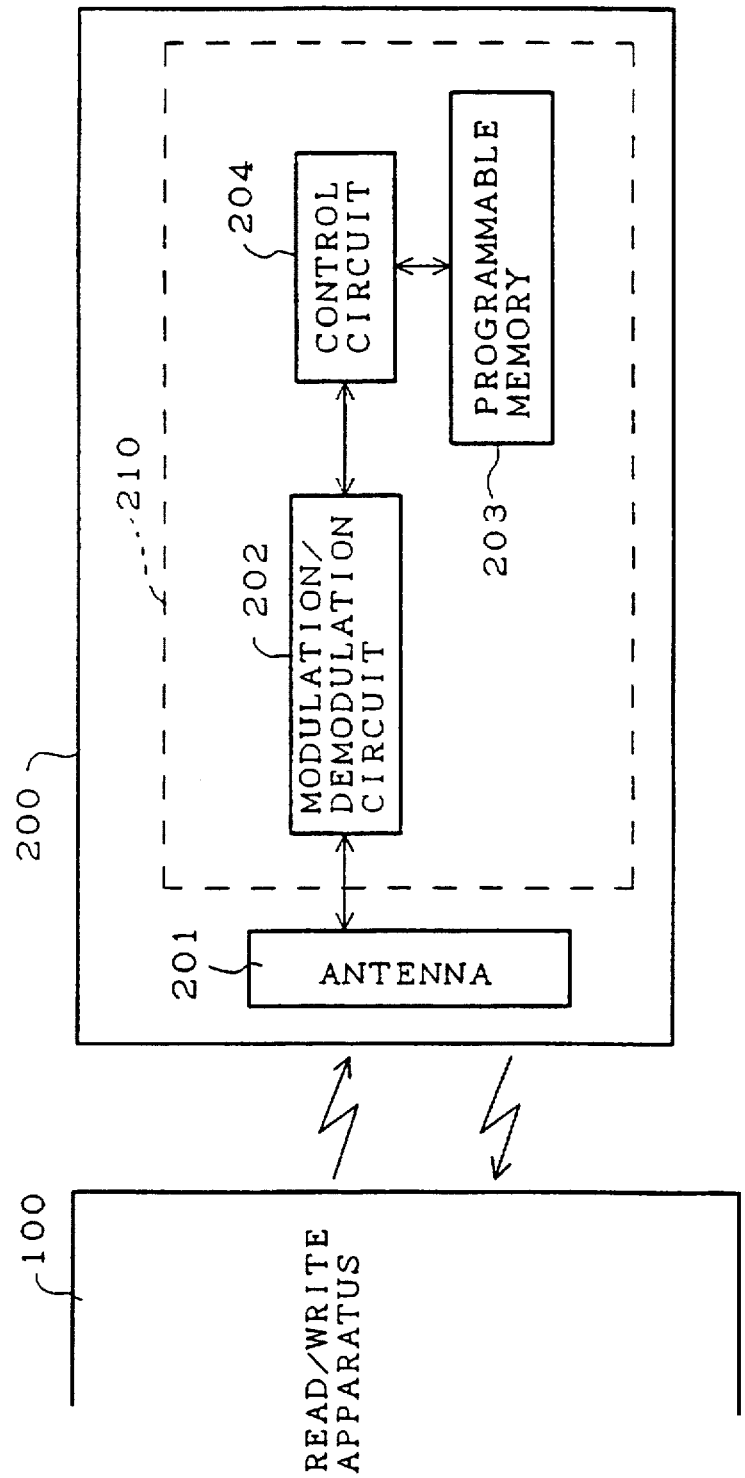
FIG. 26 is a block diagram showing a configuration of a conventional non-contact type IC card communication system.
Figure 27:
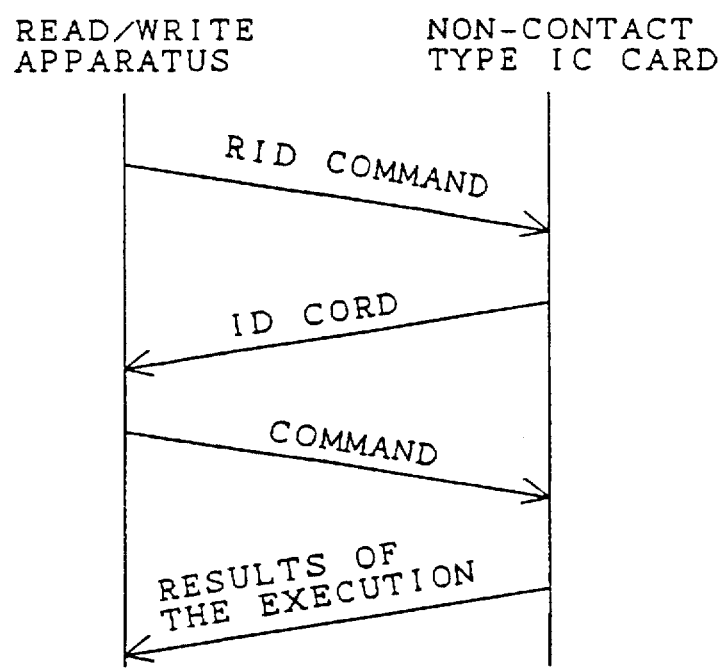
FIG. 27 is a sequence chart showing communication procedures between a read/write apparatus and a non-contact type IC card in a conventional system.

FIG. 24 is a sequence chart showing communication procedures between the non-contact type IC card 400 and the read/write apparatus 300 in this embodiment. As shown in FIG. 24, the collations of the MRP and the MWP are performed similarly to those of the sixth embodiment.

The MRP collation coincidence flag 461 and MWP collation coincidence flag 471 are set to "H" when the input MRP and the inputted MWP coincidence with the stored MRP and MWP respectively as the result of the collation procedures. Thereafter, when a read command or a write command is sent from the read/write apparatus 300, the command counter 484 counts a number of input commands and outputs a counted number. The comparing circuit 482 outputs an "H" level signal when the counted number exceeds n. Therefore, the (n+1)-th command and commands after the (n+1)-th command sent from the read/write apparatus 300 may be executed for all the addresses of the programmable memory 403 regardless of the results of the password collation procedures. Further, the non-contact type IC card 400 may be configured such that only the commands between the i-th command and j-th command after the MRP collation coincidence flag 461 and MWP collation coincidence flag 471 are set to "H" are allowed without a password coincidence (i, j:integer, i<j) as explained in the fifth embodiment. Furthermore, the collation of the passwords PW1 to PW5 may be omitted as explained in the second embodiment.

As explained above, in this embodiment, security is made higher because a memory access is allowed only after both the input MRP and the input MWP coincide with the stored MRP and MWP.

What is claimed is:

1. A communication apparatus that communicates with an external apparatus, comprising:
   a memory divided into a first area and a second area, the first area including a third area for storing a code indicating that access from the external apparatus to the memory requires a coincidence of a first password;
   deciding means for deciding whether the code is stored in the third area;
   password collating means for collating a first password sent from the external apparatus with a first password stored in the communication apparatus when the external apparatus accesses communication apparatus; and
   access allowing means for allowing access from the external apparatus to the second area if the first password from the external apparatus coincides with the first password stored in the communication apparatus as a result of a collation of the password collating means when the code is stored in the third area and for allowing access from the external apparatus to the first area or to the second area regardless of a result of the first password collation of the password collating means when the code is not stored in the third area.

2. The communication apparatus according to claim 1, wherein the deciding means determines whether the code is stored in the third area or not during a period from a time when the communication apparatus receives a command from the external apparatus, which requests the communication apparatus to send an identification code to a time when the communication apparatus sends an identification code to the external apparatus.

3. The communication apparatus according to claim 1, wherein the first area includes a fourth area in which a second password is stored, wherein when a second password is sent from the external apparatus when the predetermined code is stored in the third area, the password collating means collates said second password sent from the external apparatus with the second password stored in the fourth area, and wherein the access allowing means allows an access from the external apparatus to the first area or to the second area without requiring a coincidence of a first password in a collation performed by the password collating means.

4. The communication apparatus according to claim 2, wherein the first area includes a fourth area in which a second password is stored, wherein when a second password is sent from the external apparatus when the predetermined code is stored in the third area, the password collating means collates the second password from the external apparatus with the second password stored in the fourth area, and wherein the access allowing means allows an access from the external apparatus to the first area or to the first area or to the second area without requiring a coincidence of a first password in a collation performed by the password collating means.

5. The communication apparatus according to claim 1, wherein the first area includes a fourth area in which a second password is stored, wherein when a second password is sent from the external apparatus when the predetermined code is stored in the third area, the password collating means collates the second password sent from the external apparatus with the second password stored in the fourth area, and wherein the communication apparatus further includes counting means for counting a number of commands from the external apparatus after a coincidence of a second password is obtained in collation performed by the password collating means, and wherein the access allowing means allows an access from the external apparatus to the first area or to the second area without requiring a coincidence of a first password in a collation performed by the password collating means when a coincidence of a second password is obtained in collation performed by the password collating means and when a number of commands counted by the counting means exceeds a predetermined number.

6. The communication apparatus according to claim 2, wherein the first area includes a fourth area in which a second password is stored, wherein when a second password is sent from the external apparatus when the predetermined code is stored in the third area, the password collating means collates the second password from the external apparatus with the second password stored in the fourth area, wherein the communication apparatus further includes counting means for counting a number of commands sent from the external apparatus after a coincidence of a second password is obtained in a collation performed by |said the password collating means, and | wherein the access allowing means allows access from the external apparatus to the first area or to the second area without requiring a coincidence of a first password in a collation performed by the password collating means when a coincidence of a second password is obtained in a collation performed by the password collating means and when a number of commands counted by the counting means exceeds a predetermined number.

7. The communication apparatus according to claim 1, wherein the first area includes a fourth area in which a second password is stored, wherein when a second password is sent from the external apparatus when the predetermined code is stored in the third area, the password collating means collates the second password from the external apparatus with the second password stored in the fourth area, wherein the communication apparatus further includes counting means for counting a number of commands from the external apparatus after a coincidence of a second password is obtained in a collation performed by the password collating means, and wherein the access allowing means allows access from the external apparatus to the first area or to the second area without requiring a coincidence of a first password in a collation performed by the password collating means when a coincidence of a second password is obtained in a collation performed by the password collating means and when a number of commands counted by the counting means is greater than or equal to a first predetermined number and is less than or equal to a second predetermined number.

8. The communication apparatus according to claim 2, wherein the first area includes a fourth area in which a second password is stored, wherein when a second password is sent from the external apparatus when the predetermined code is stored in the third area, the password collating means collates the second password sent from the external apparatus with the second password stored in the fourth area, wherein the communication apparatus further includes counting means for counting a number of commands sent from the external apparatus after a coincidence of a second password is obtained in a collation performed by the password collating means, and wherein the access allowing means allows access from the external apparatus to the first area or to the second area without requiring a coincidence of a first password in a collation performed by the password collating means when a coincidence of a second password is obtained in a collation performed by the password collating means and when a number of commands counted by the counting means is greater than or equal to a first predetermined number and is less than or equal to a second predetermined number.

9. The communication apparatus according to claim 3, wherein the second password includes a read password that is collated when data stored in the memory is read and a write password to be collated when data are written to the memory, wherein the fourth area includes a read password area for storing the read password and a write password area for storing the write password, wherein when a read password is sent from the external apparatus when the predetermined code is stored in the third area, the password collating means collates the read password stored in the read password area with the read password sent from the external apparatus, wherein when a write password is sent from the external apparatus when the predetermined code is stored in the third area, the password collating means collates the write password stored in the write password area with the write password from the external apparatus, wherein the access allowing means allows a read command from the external apparatus for the first area of for the second area without requiring a coincidence of a first password when a read password coincidence is obtained as a result of a collation performed by the password collating means, and wherein the access allowing means allows a write command from the external apparatus for the first area or for the second area without requiring a coincidence of a first password when a write password coincidence is obtained as a result of a collation performed by the password collating means.

10. The communication apparatus according to claim 3, wherein the second password includes a read password that is collated when data stored in the memory is read and a write password to be collated when data is written to the memory, wherein the fourth area includes a read password area for storing the read password and a write password area for storing the write password, wherein when a read password is sent from the external apparatus when the predetermined code is stored in the third area, the password collating means collates the read password stored in the read password area with the read password sent from the external apparatus, wherein when a write password is sent from said external apparatus when the predetermined code is stored in the third area, the password collating means collates the write password stored in the write password area with the write password sent from the external apparatus, wherein the access allowing means allows both a read command from the external apparatus for the first area or for the second area and a write command from the external apparatus for the first area or for the second area without requiring a coincidence of a first password when both a read password coincidence and a write password coincidence are obtained as a result of a collation performed by the password collating means.

11. A communication apparatus that communicates with an external apparatus, comprising:

a memory divided into a first area and a second area, the first area including a third area for storing a predetermined code indicating that access from the external apparatus to the memory requires a coincidence of a first password;

deciding means for deciding whether the predetermined code is stored in the third area;

password collating means for collating a first password sent from the external apparatus with a first password stored in the communication apparatus when the external apparatus makes access to the communication apparatus when the predetermined code is stored in the third area; and access allowing means for allowing access from the external apparatus to the second area if a first password from the external apparatus coincides with a first password stored in the communication apparatus as a result of a collation of the password collating means when said predetermined code is stored in the third area and for allowing access from the external apparatus to the first area or to the second area without performing a first password collation of the password collating means when the predetermined code is not stored in the third area.

12. The communication apparatus according to claim 11, wherein the deciding means decides whether the predetermined code is stored in the third area during a period from a time when the communication apparatus receives a command from the external apparatus, that requests the communication apparatus to send an identification code, to a time when the communication apparatus sends an identification code to the external apparatus.

13. The communication apparatus according to claim 11, wherein the first area includes a fourth area in which a second password is stored, wherein when a second password is sent from the external apparatus when the predetermined code is stored in the third area, the password collating means collates the second password from the external apparatus with the second password stored in the fourth area, and wherein the access allowing means allows access from the external apparatus to the first area or to the second area without requiring a coincidence of a first password in a collation performed by the password collating means.

14. The communication apparatus according to claim 12, wherein the first area includes a fourth area in which a second password is stored, wherein when a second password is sent from the external apparatus when the predetermined code is stored in the third area, the password collating means collates the second password from the external apparatus with the second password stored in the fourth area, and wherein the access allowing means allows access from the external apparatus to the first area or to the second area without requiring a coincidence of a first password in a collation performed by the password collating means.

15. The communication apparatus according to claim 11, wherein the first area includes a fourth area in which a second password is stored, wherein when a second password is sent from the external apparatus when the predetermined code is stored in the third area, the password collating means collates the second password from the external apparatus with the second password stored in the fourth area, wherein the communication apparatus further includes counting means for counting a number of commands from the external apparatus after a coincidence of a second password is obtained in a collation performed by the password collating means, and wherein the access allowing means allows access from the external apparatus to the first area or to the second area without requiring a coincidence of a first password in a collation performed by the password collating means when a coincidence of a second password is obtained in a collation by the password collating means and when a number of commands counted by the counting means exceeds a predetermined number.

16. The communication apparatus according to claim 12, wherein the first area includes a fourth area in which a second password is stored, wherein when a second password is sent from the external apparatus when the predetermined code is stored in the third area, the password collating means collates the second password from the external apparatus with the second password stored in the fourth area, wherein the communication apparatus further includes counting means for counting a number of commands from the external apparatus after a coincidence of a second password is obtained in a collation performed by the password collating means, and wherein the access allowing means allows access from the external apparatus to the first area or to the second area without requiring a coincidence of a first password in a collation performed by the password collating means when a coincidence of a second password is obtained in a collation by the password collating means and when a number of commands counted by the counting means exceeds a predetermined number.

17. The communication apparatus according to claim 11, wherein the first area includes a fourth area in which a second password is stored, wherein when a second password is sent from the external apparatus when the predetermined code is stored in the third area, the password collating means collates the second password from the external apparatus with the second password stored in the fourth area, wherein the communication apparatus further includes counting means for counting a number of commands from the external apparatus after a coincidence of a second password is obtained in a collation performed by the password collating means, and wherein the access allowing means allows access from the external apparatus to the first area or to the second area without requiring a coincidence of a first password in a collation performed by the password collating means when a coincidence of a second password is obtained in a collation performed by the password collating means and when a number of commands counted by the counting means is greater than or equal to a first predetermined number and is less than or equal to a second predetermined number.

18. The communication apparatus according to claim 12, wherein the first area includes a fourth area in which a second password is stored, wherein when a second password is sent from the external apparatus when the predetermined code is stored in the third area, the password collating means collates the second password from the external apparatus with the second password stored in the fourth area, wherein the communication apparatus further includes counting means for counting a number of commands from the external apparatus after a coincidence of a second password is obtained in a collation performed by the password collating means, and wherein the access allowing means allows access from the external apparatus to the first area or to the second area without requiring a coincidence of a first password in a collation performed by the password collating means when a coincidence of a second password is obtained in a collation performed by the password collating means and when a number of commands counted by the counting means is greater than or equal to a first predetermined number and is less than or equal to a second predetermined number.

19. The communication apparatus according to claim 13, wherein the second password includes a read password that is collated when data stored in the memory is read and a write password that is collated when data is written to the memory, wherein the fourth area includes a read password area for storing the read password and a write password area for storing the write password, wherein when a read password is sent from the external apparatus when the predetermined code is stored in the third area, the password collating means collates the read password stored in the read password area with the read password from the external apparatus, wherein when a write password is sent from the external apparatus when the predetermined code is stored in the third area, the password collating means collates the write password stored in the write password area with the write password from the external apparatus, wherein the access allowing means allows a read command from the external apparatus for the first area or for the second area without requiring a coincidence of a first password when a read password coincidence is obtained as a result of a collation performed by the password collating means, and wherein the access allowing means allows a write command from the external apparatus for the first area or for the second area without requiring a coincidence of a first password when a write password coincidence is obtained as a result of a collation performed by the password collating means.

20. The communication apparatus according to claim 13, wherein the second password includes a read password that is collated when data stored in the memory is read and a write password that is collated when data is written to the memory, wherein the fourth area includes a read password area for storing the read password and a write password area for storing the write password, wherein when a read password is sent from the external apparatus when the predetermined code is stored in the third area, the password collating means collates the read password stored in the read password area with the read password from the external apparatus, wherein when a write password is sent from the external apparatus when the predetermined code is stored in the third area, the password collating means collates the write password stored in the write password area with the write password from the external apparatus, wherein the access allowing means allows both a read command from the external apparatus for the first area or for the second area and a write command from the external apparatus for the first area or for the second area without requiring a coincidence of a first password when both a read password coincidence and a write password coincidence are obtained as a result of a collation performed by the password collating means.

* * * * *

UNITED STATES PATENT AND TRADEMARK OFFICE
CERTIFICATE OF CORRECTION

PATENT NO.   : 5,796,943
DATED        : August 18, 1998
INVENTOR(S)  : Shuzo Fujioka It is certified that error appears in the above-identified patent and that said Letters Patent is hereby corrected as shown below:

Column 16,  Line 17, after "accesses" insert --the--;

Line 33, after "code" insert --,--;

Line 55, delete "or to the first area";

Column 17,  Line 21, delete "[said";

Line 22, delete "]";

Column 18,  Line 22, change "of" to --or--.

Signed and Sealed this

Fifth Day of January, 1999

Attest:

Attesting Officer

Acting Commissioner of Patents and Trademarks